United States Patent
Reddappagari et al.

(10) Patent No.: US 9,729,287 B2
(45) Date of Patent: *Aug. 8, 2017

(54) CODEC WITH VARIABLE PACKET SIZE

(71) Applicant: Facebook, Inc., Menlo Park, CA (US)

(72) Inventors: Parama Jyothi Reddappagari, Redmond, WA (US); Naizhi Li, Redmond, WA (US); Alexander Narest, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/562,573

(22) Filed: Dec. 5, 2014

(65) Prior Publication Data
US 2016/0164651 A1    Jun. 9, 2016

(51) Int. Cl.
*H04L 5/00*    (2006.01)
*H04M 7/00*    (2006.01)
*H04L 12/26*    (2006.01)

(52) U.S. Cl.
CPC ........ *H04L 5/0044* (2013.01); *H04L 43/0864* (2013.01); *H04M 7/0072* (2013.01)

(58) Field of Classification Search
USPC ......................................................... 370/252
See application file for complete search history.

(56) References Cited

U.S. PATENT DOCUMENTS

| | | | |
|---|---|---|---|
| 4,597,090 A | 6/1986 | Forney et al. | |
| 5,258,979 A | 11/1993 | Oomuro et al. | |
| 6,272,539 B1 * | 8/2001 | Cuomo | H04L 41/22 709/223 |
| 6,373,839 B1 | 4/2002 | Clark et al. | |
| 6,421,387 B1 * | 7/2002 | Rhee | H04B 1/66 375/240.12 |
| 6,510,409 B1 | 1/2003 | Su et al. | |
| 6,798,786 B1 | 9/2004 | Lo et al. | |
| 7,110,422 B1 | 9/2006 | Choudhury et al. | |
| 8,176,154 B2 | 5/2012 | Minhazuddin et al. | |
| 8,248,935 B2 | 8/2012 | Rossler | |
| 8,483,699 B1 | 7/2013 | Oroskar | |
| 2001/0001000 A1 | 5/2001 | Thomas et al. | |
| 2001/0011216 A1 | 8/2001 | Lee et al. | |
| 2002/0001302 A1 | 1/2002 | Pickett | |

(Continued)

OTHER PUBLICATIONS

WebRTC, Google, Inc., [online] 2011-2012, http://www.webrtc.org/ [Accessed Nov. 5, 2014], 1 page.

(Continued)

*Primary Examiner* — Mohammad Anwar
*Assistant Examiner* — Kokou R Detse
(74) *Attorney, Agent, or Firm* — Perkins Coie LLP

(57) ABSTRACT

Various of the disclosed embodiments improve encoding during a network call, such as a Voice Over Internet Protocol (VOIP) connection, by adjusting the size of a data communications packet ("packet"). Particularly, given a corpus of codecs with which to encode data, the embodiments may identify a packet size based upon a common multiple of each codec's minimum raw data size. The packet size may be selected to accommodate the inclusion of data encoded in each codec format, as well as error correction code data, and codec transition commands. The packet size may be tailored to trade off measured latency and data efficiency.

20 Claims, 30 Drawing Sheets

(56) References Cited

U.S. PATENT DOCUMENTS

| | | |
|---|---|---|
| 2002/0072368 A1 | 6/2002 | Sawada et al. |
| 2002/0075869 A1 | 6/2002 | Shah |
| 2002/0116186 A1 | 8/2002 | Strauss et al. |
| 2002/0141392 A1 | 10/2002 | Tezuka et al. |
| 2002/0184373 A1 | 12/2002 | Maes |
| 2004/0001479 A1 | 1/2004 | Pounds et al. |
| 2004/0017910 A1 | 1/2004 | Lim et al. |
| 2004/0032860 A1 | 2/2004 | Mundra et al. |
| 2004/0038701 A1 | 2/2004 | Lin et al. |
| 2004/0076333 A1 | 4/2004 | Zhang et al. |
| 2004/0086039 A1 | 5/2004 | Reynolds et al. |
| 2004/0186933 A1* | 9/2004 | Nanki ............... H03M 7/04 710/33 |
| 2004/0258177 A1 | 12/2004 | Shen et al. |
| 2005/0100055 A1 | 5/2005 | Omori et al. |
| 2005/0197964 A1 | 9/2005 | Duggan et al. |
| 2005/0201414 A1 | 9/2005 | Awais et al. |
| 2005/0259636 A1 | 11/2005 | Chun et al. |
| 2005/0276323 A1 | 12/2005 | Martemyanov et al. |
| 2006/0008003 A1 | 1/2006 | Ji et al. |
| 2006/0041431 A1 | 2/2006 | Maes et al. |
| 2006/0174015 A1 | 8/2006 | Arauz-Rosado et al. |
| 2006/0218291 A1 | 9/2006 | Zhu et al. |
| 2007/0011277 A1 | 1/2007 | Neff et al. |
| 2007/0053303 A1 | 3/2007 | Kryuchkov et al. |
| 2007/0053604 A1 | 3/2007 | Lee et al. |
| 2007/0086485 A1 | 4/2007 | Vega-Garcia |
| 2007/0115949 A1 | 5/2007 | Han et al. |
| 2007/0116186 A1 | 5/2007 | Han et al. |
| 2007/0121514 A1 | 5/2007 | Goldstein et al. |
| 2007/0189275 A1 | 8/2007 | Neff |
| 2007/0206505 A1 | 9/2007 | Forbes et al. |
| 2007/0242704 A1 | 10/2007 | Jiang et al. |
| 2007/0250625 A1 | 10/2007 | Titus et al. |
| 2007/0294087 A1 | 12/2007 | Lakaniemi et al. |
| 2008/0008312 A1 | 1/2008 | Ganesamoorthi et al. |
| 2008/0031153 A1 | 2/2008 | Punreddy et al. |
| 2008/0101338 A1 | 5/2008 | Reynolds et al. |
| 2008/0195748 A1 | 8/2008 | Tierney et al. |
| 2009/0003436 A1 | 1/2009 | Levin et al. |
| 2009/0327499 A1 | 12/2009 | Strickland et al. |
| 2010/0002688 A1 | 1/2010 | Yeom et al. |
| 2010/0094931 A1* | 4/2010 | Hosur ............... H04N 7/17318 709/203 |
| 2010/0099400 A1 | 4/2010 | Lefeuvre et al. |
| 2010/0279701 A1 | 11/2010 | Chen et al. |
| 2011/0137660 A1 | 6/2011 | Strommer et al. |
| 2011/0141890 A1 | 6/2011 | Giaretta et al. |
| 2011/0211634 A1 | 9/2011 | Goedeken et al. |
| 2011/0317647 A1* | 12/2011 | Cho ............... H04L 5/0007 370/329 |
| 2012/0039382 A1 | 2/2012 | Vonog et al. |
| 2012/0044817 A1 | 2/2012 | Harper et al. |
| 2012/0082304 A1 | 4/2012 | Byrne et al. |
| 2012/0123780 A1 | 5/2012 | Gao et al. |
| 2012/0154506 A1 | 6/2012 | Sylvain et al. |
| 2012/0195201 A1 | 8/2012 | Ishikawa et al. |
| 2012/0294159 A1 | 11/2012 | Sridhar et al. |
| 2012/0297266 A1 | 11/2012 | Xu et al. |
| 2013/0317812 A1* | 11/2013 | Jeong ............... G10L 19/0212 704/203 |
| 2014/0010289 A1 | 1/2014 | Lukasik et al. |
| 2014/0101328 A1 | 4/2014 | Coulombe et al. |
| 2014/0241168 A1 | 8/2014 | Merlin et al. |
| 2015/0117232 A1 | 4/2015 | Dunne |
| 2015/0169396 A1 | 6/2015 | Tsyganok |
| 2015/0215464 A1 | 7/2015 | Shaffer |
| 2015/0237105 A1 | 8/2015 | Satoda |
| 2015/0263880 A1 | 9/2015 | Wang et al. |
| 2016/0094718 A1 | 3/2016 | Mani et al. |
| 2016/0103653 A1 | 4/2016 | Jang |
| 2016/0164937 A1 | 6/2016 | Reddappagari et al. |
| 2016/0164942 A1 | 6/2016 | Reddappagari et al. |
| 2016/0165015 A1 | 6/2016 | Reddappagari et al. |
| 2016/0165058 A1 | 6/2016 | Vander Mey et al. |
| 2016/0165059 A1 | 6/2016 | Deng et al. |
| 2016/0165060 A1 | 6/2016 | Li et al. |
| 2016/0277471 A1 | 9/2016 | Coulombe |

OTHER PUBLICATIONS

Network Working Group, Internet Draft, "Using RTP Control Protocol (RTCP) Feedback for Unicast Multimedia Congestion Control," University of Glascow, Jul. 24, 2014, http://tools.ietf.org/html/draft-ietf-rmcat-rtp-cc-feedback-00 [Accessed on Sep. 22, 2014], 8 pages.

Video Encoding Software, Version 1.2, Released: May 30, 2014, HTML5 and Video, A Complete Programming Guide to Video Compatibility with the Popular Front-End Development Language Cloud Encoder, 2013, http://www.encoding.com/html5/ [Accessed Sep. 3, 2014], 6 pages.

U.S. Appl. No. 14/562,564 of Reddappagari et al., filed Dec. 5, 2014.

U.S. Appl. No. 14/562,568 of Vander Mey et al., filed Dec. 5, 2014.

U.S. Appl. No. 14/562,580 of Reddappagari et al., filed Dec. 5, 2014.

U.S. Appl. No. 14/562,594 of Reddappagari et al., filed Dec. 5, 2014.

U.S. Appl. No. 14/562,595 of Deng et al., filed Dec. 5, 2014.

U.S. Appl. No. 14/562,598 of Li et al., filed Dec. 5, 2014.

Final Office Action mailed Nov. 22, 2016, for U.S. Appl. No. 14/562,564 of Reddappagari, P., filed Dec. 5, 2014.

Non-Final Office Action mailed Dec. 1, 2016, for U.S. Appl. No. 14/562,598 of Li, N., filed Dec. 5, 2014.

Non-Final Office Action mailed Oct. 7, 2016, for U.S. Appl. No. 14/562,568 of Reddappagari, P., filed Dec. 5, 2014.

Final Office Action mailed Dec. 16, 2016, for U.S. Appl. No. 14/562,580 of Reddappagari, P., filed Dec. 5, 2014.

Cai et al., "3D Data Codec and Transmission over the Internet," ACM 978-1-59593-652-03/07/0004, Apr. 2007, pp. 53-56.

Dutra et al., "Hyperspectral Image Coding with LVQ-SPECK," IEEE 978-1-4244-1684-4/08, 2008, pp. 3454-3457.

Final Office Action mailed Jan. 18, 2017, for U.S. Appl. No. 14/562,595 of Deng, H., filed Dec. 5, 2014.

Notice of Allowance mailed Jan. 23, 2017 for U.S. Appl. No. 14/562,568 of Mey, C., filed Dec. 5, 2014.

Zhao et al., "A JPEG Codec Adaptive to Region Importance," ACM 0-89791-871-1/96/11, 1996, pp. 209-218.

Restriction Requirement mailed Jan. 23, 2017, for U.S. Appl. No. 14/562,594 of Reddappagari, P., filed Dec. 5, 2014.

Non-Final Office Action mailed Jul. 27, 2016, for U.S. Appl. No. 14/562,595 of Deng, H., et al. filed Dec. 5, 2014.

Non-Final Office Action mailed Jun. 23, 2016, for U.S. Appl. No. 14/562,594 of Reddappagari, P., filed Dec. 5, 2014.

Non-Final Office Action mailed May 10, 2016, for U.S. Appl. No. 14/562,564 of Reddappagari, P., filed Dec. 5, 2014.

Non-Final Office Action mailed Aug. 17, 2016, for U.S. Appl. No. 14/562,580 of Reddappagari, P., filed Dec. 5, 2014.

Advisory Action dated Mar. 13, 2017 for U.S. Appl. No. 14/562,564 of Reddappagari, P., filed Dec. 5, 2014.

Notice of Allowance dated Mar. 30, 2017, for U.S. Appl. No. 14/562,580 of Reddappagari et al., filed Dec. 5, 2014.

Non-Final Office Action dated Jun. 15, 2017 for U.S. Appl. No. 14/562,564 of Reddappagari, P., filed Dec. 5, 2014.

* cited by examiner

| Parameter Value | Codec to Use | Rule to use |
|---|---|---|
| 1 | C1 | none |
| 2 | C1 | none |
| 3 | C1 or C2 | Rule 1 |
| 4 | C2 or C3 | Rule 2 |
| 5 | C2 or C3 or C4 | Rule 3 |
| 6 | C4 | None |

CODEC WITH VARIABLE PACKET SIZE

BACKGROUND

Users of modern telecommunications systems demand reliable and efficient multimedia communication across networks of varying quality and bandwidth. For example, during a Voice Over Internet Protocol (VOIP) connection, users expect a low-latency, high fidelity interaction satisfying their personal preferences. Factors such as the selection of the audio and/or video codecs by the system, the manner in which VOIP communications traverse the network, and the handling of ancillary features, such as "comfort noise," may all impact the end user experience. Comfort noise is synthetically generated background noise used in digital communications to replace silence. Orchestrating these various factors to achieve a suitable user experience may be beyond the capabilities of the user and/or manufacturers of devices that are presently used in these telecommunications systems.

VOIP systems employ session control and signaling protocols to control the signaling, set-up, and tear-down of calls. These protocols may specify different codecs to achieve different functions and levels of quality. Unfortunately, this protocol and codec diversity may not serve to maintain quality across disparate geographic regions and telecommunication systems. Networks grow and contract dynamically and configurations suitable for conditions at one time and place may be unsuitable at another time and place. This may be particularly true for long distance traffic, where the number of variables increases.

A receiving VOIP device re-sequences IP packets that arrive out of order and compensates for packets arriving too late or not at all. Rapid and unpredictable changes in queue lengths may result along a given Internet path due to competition from other users for the same transmission links. Consequently, a static VOIP protocol and system may fail to adapt sufficiently within a desired interval or may fail to adapt at all. Systems and methods to address bottlenecks and unforeseeable contingencies are desired to improve the VOIP experience.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

Figure 1:
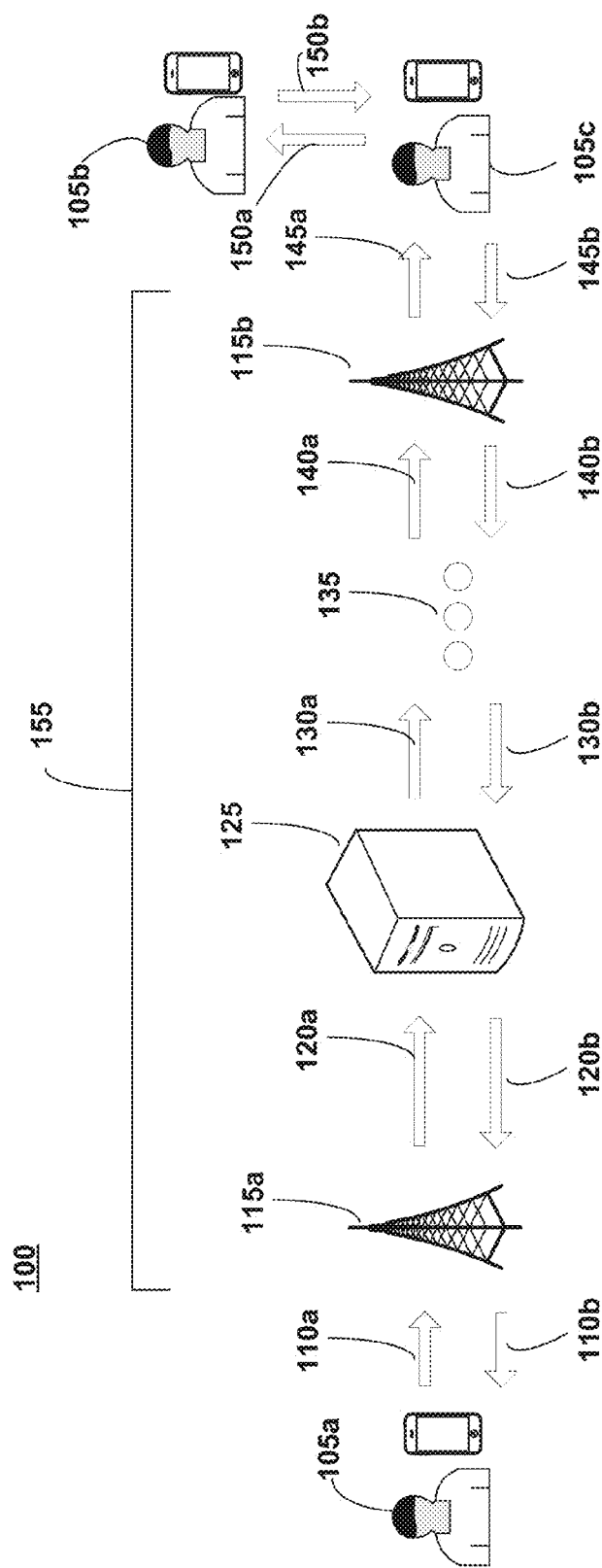
FIG. 1 is a block diagram illustrating an example packet-traversal topology between various network devices as may occur in some embodiments.

While the flow and sequence diagrams presented herein show an organization designed to make them more comprehensible by a human reader, those skilled in the art will appreciate that actual data structures used to store this information may differ from what is shown, in that they, for example, may be organized in a different manner; may contain more or less information than shown; may be compressed and/or encrypted; etc.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Similarly, some components and/or operations may be separated into different blocks or combined into a single block for the purposes of discussion of some of the embodiments. Moreover, while the various embodiments are amenable to various modifications and alternative forms, specific embodiments have been shown by way of example in the drawings and are described in detail below. The intention, however, is not to limit the particular embodiments described. On the contrary, the embodiments are intended to cover all modifications, equivalents, and alternatives falling within the scope of the disclosed embodiments as defined by the appended claims.

DETAILED DESCRIPTION

Various of the disclosed embodiments enable managing and augmenting "comfort noise" during a network call, such as a Voice Over Internet Protocol (VOIP) connection. Particularly, traditional systems typically send machine-generated comfort noise, or a command to generate comfort noise at the recipient, on a channel separate from the conversation content. Some embodiments reduce this overhead by embedding the comfort noise in the media stream. In other embodiments, audio encoding is stopped at the source when the speaker falls silent and the recipient, after detecting the cessation, will generate white noise at its end. These approaches may be used in conjunction with a determination of the available bandwidth and channel parameters.

Various of the disclosed embodiments improve the initial codec selection in a Voice Over Internet Protocol (VOIP) connection. Particularly, rather than select an initial codec for the connection arbitrarily or based on data measured during the connection, embodiments analyze attributes of data exchanged prior to connection establishment to identify the appropriate initial codec. Attributes of the offer message transmission and acknowledgement may be used to infer channel quality. Signal strength, the existence of a WiFi connection, previous codecs used, etc., may also be taken into consideration. Latency measurements may be used as a proxy for measuring available bandwidth. Based on these factors, a codec having appropriate attributes may be selected. Traditional rate shaping methods may be applied subsequent to the initial codec selection.

Various of the disclosed embodiments improve encoding during a network call, such as a Voice Over Internet Protocol (VOIP) connection, by adjusting the size of a data communications packet ("packet"). Particularly, given a corpus of codecs with which to encode data, the embodiments may identify a packet size based upon a common multiple of each codec's minimum raw data size. The packet size may be selected to accommodate the inclusion of data encoded in each codec format, as well as error correction code data, and codec transition commands. The packet size may be tailored to trade off measured latency and data efficiency.

Various of the disclosed embodiments improve audio and video quality in a Voice Over Internet Protocol (VOIP) connection that includes both audio and video. Particularly, different audio and video codecs may be used and parameters assigned based upon the context in which the communication occurs. For example, audio quality may take precedence over video quality when discussing a matter in a chatroom. Conversely, video quality may take precedence over audio quality when playing a collaborative video game. VP9 may be used to encode video while a combination of, e.g., Internet Speech Audio Codec (ISAC) and SPEEX may be used to encode audio. Bandwidth determinations for each channel may also influence the respective codec selections.

Various of the disclosed embodiments reduce the impact of Real-time Transport Control Protocol (RTCP) overhead by including RTCP information in media packets themselves. The RTCP header information values may be selected based on the context and organized in a unique format for transport in the media packets. For example, RTT, packet loss, and bandwidth estimates may dictate when and how RTCP data is moved into the media packet. An interface may be provided for extracting the data so that clients may easily integrate the embodiments with existing RTCP-based systems. Inclusion of the RTCP information in the media packet may increase the media packet size, which may be anticipated and accounted for in bandwidth assessments and accommodations.

Various of the disclosed embodiments improve encoding during a network call, such as a Voice Over Internet Protocol (VOIP) connection, by correlating various contextual parameters from previous calls, with appropriate settings for a current call. For example, the system may take note of the model of cell phone used during a communication, the carrier, the presence or absence of a WiFi connection, the user rating for call quality, the codecs employed, etc. During a subsequent call, the system may compare these past calling parameters with the current situation, and may select call settings (e.g., codec selections) based thereon. Machine learning methods may be applied using the past data to inform the selection of the settings for the present call.

In various embodiments, a corpus of codecs may be correlated with different, partially overlapping ranges of transmission characteristics. As channel conditions degrade or improve, the system may select a new codec with which to continue the connection based upon the corresponding potentially overlapping range. Codecs may not be switched immediately when the transmission characteristics enter overlapping ranges, to avoid degrading the user's experience. If the characteristics remain in the overlap, or manifest a likely progression toward another region, then the transition may be effected.

Various examples of the disclosed techniques will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the techniques can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the embodiments. Indeed, certain terms may even be emphasized below; however, any terminology intended to be interpreted in any restricted manner will be overtly and specifically defined as such in this section.

Overview—Example Network Topology

FIG. 1 is a block diagram illustrating an example packet-traversal topology between various network devices as may occur in some embodiments. Users may wish to converse with one another, e.g., using a VOIP communication protocol. In some instances, the users may initiate a direct connection. For example, user 105b may communicate directly with user 105c via a direct, ad hoc connection 150a, 150b. In other instances, the users may wish to converse across a network 155 of devices.

The network 155 may be a cellular network, the Internet, a local area network, etc. For example, the network 155 may include cellular towers 115a, intermediary devices 125, such as relays, and various other intermediary nodes 135. Packets may traverse the network from/to user 105a to/from user 105c and from/to user 105c to/from user 105b. Bandwidth and resource availability may be determined at each outgoing interconnection 110a, 120a, 130a, 140a, 145a and at each incoming interconnection 110b, 120b, 130b, 140b, 145b.

Variable Packet Size

Various of the disclosed embodiments improve encoding during a network connection, such as a Voice Over Internet Protocol (VOIP) call, by adjusting the size of a data communications packet ("packet"). Particularly, given a corpus of codecs with which to encode data, the embodiments may identify a packet size based upon a common multiple of the codecs' minimum raw data sizes. The packet size may be selected to accommodate the inclusion of data encoded in any of the codec's formats, as well as error correction code data, and codec transition commands. The packet size may be tailored to trade off measured latency and data efficiency. The bandwidth estimate may affect, e.g.: 1) the packet size; 2) which codec(s) is/are applied; 3) the bitrate of the applied codec(s), etc. Latency may be used as a proxy for bandwidth in some embodiments.

Many prior art voice and video encoding systems place a preset amount of data into each packet. For example, a first codec may encode 20 ms of voice data in a single packet. When that packet arrives, 20 ms of audio is played out, and for each 20 ms of audio data (e.g., each 20 ms that someone speaks), a new packet is sent. Various embodiments instead package different amounts of data into packets based, e.g., on network conditions. This variable size packaging can reduce overhead, decrease overall bandwidth usage, and optimize overall audio and/or video quality, providing flexible levels of delivery under different channel conditions. Unlike rate shaping technologies, such as variable bitrate encoding and lossy encoding schemes, which trade off data accuracy for data size, various of the disclosed approaches may trade off network latency for data size.

For example, a codec may choose to encode 1000 ms of data in each packet. This may increase perceived latency, but may also reduce the number of packets sent by, e.g., 34 times. Even though this approach may generate an additional overhead of 400 bits, the net data savings may be nearly 19600 bits. The SPEEX audio codec can encode one second of speech in as little as 500 bytes. Thus the overhead in the example 20 ms packet case may be nearly 40 times larger than the audio data itself. By increasing the amount of audio placed into a window (e.g., the amount of time used for encoding), the bandwidth consumption may be decreased in low-bandwidth scenarios by 30-40×.

Some embodiments may tune the size of the window (e.g., a buffer in the encoder/decoder) to trade off a measured latency for data efficiency. For example, some embodiments may measure the round-trip-time (RTT) for media packets and set a maximum latency limit, such that RTT/2+Added Latency=Limit (where "Added Latency" refers, e.g., to latency from the buffer). In such a case, the system may satisfy latency requirements while consuming the least bandwidth possible. This may decrease user data usage but maintain an acceptable user experience.

Figure 2:
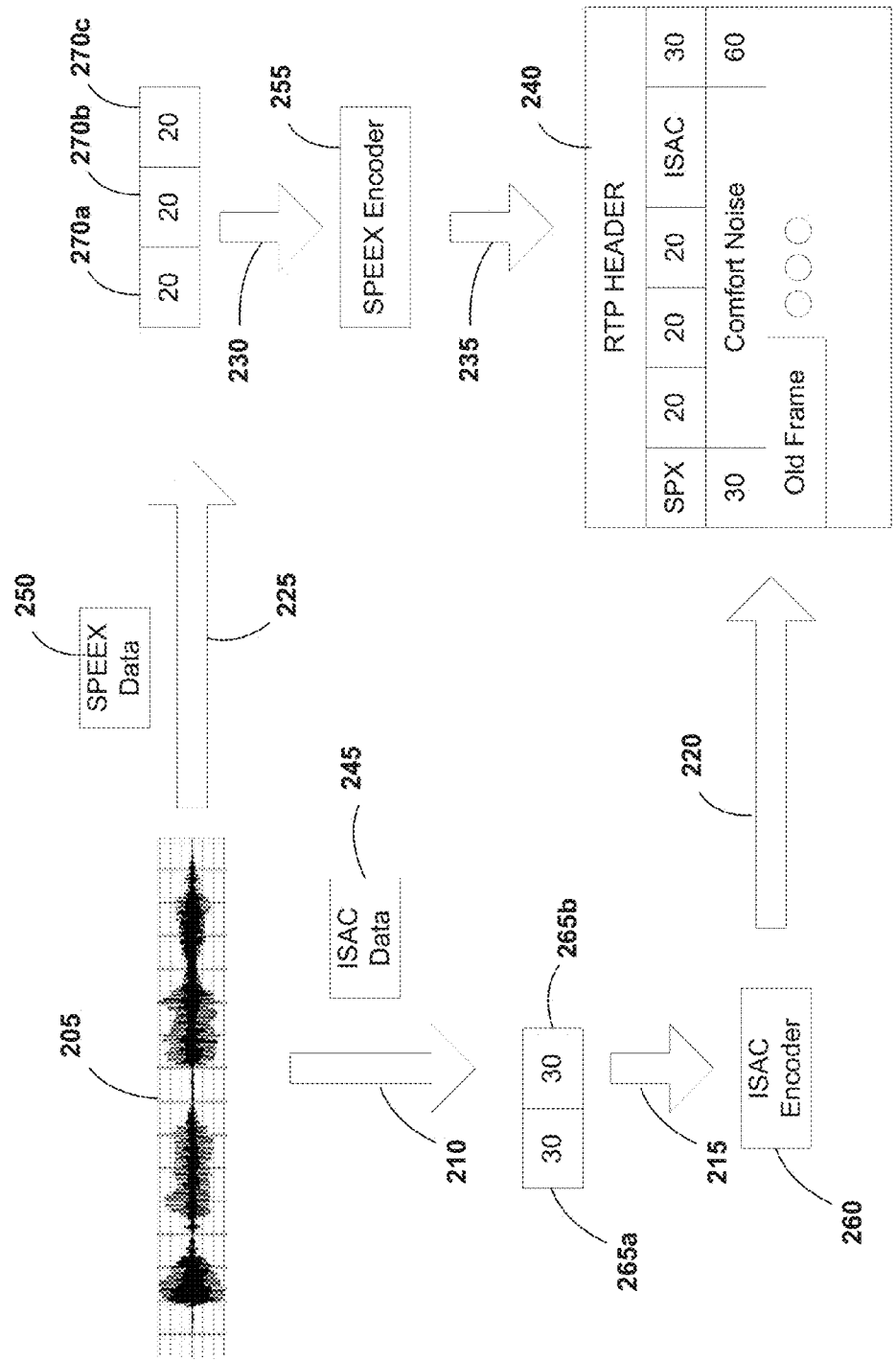
FIG. 2 is a block diagram of a variable-size composite packet format and its construction as may be implemented in some embodiments.

FIG. 2 is a block diagram of a variable-size composite packet format and its construction as may be implemented in some embodiments. Particularly, a system operating at a user device may receive audio 205 via a microphone input at the user device. Depending on various conditions and parameters (e.g., available bandwidth, user-preferred quality settings, character of the communication, etc.) the system may decide to switch from a first codec to a second codec. For example, having encoded a portion of the audio 205 using a SPEEX encoder 255, the system may decide to subsequently encode the remaining audio using the Internet Speech Audio Codec (ISAC) encoder 260. The transition may be reflected in the variable character of a packet format. The system may also encode the same portion of audio in each of the available formats (e.g., SPEEX and ISAC) to facilitate decoding diversity at the receiving device (e.g., based upon the receiving device's processing bandwidth).

Thus, the system may originally extract 225 audio in preparation for SPEEX 250 encoding. For purposes of explanation, this data may be organized into sets of 20 byte data 270a-c (one will recognize that the byte breakdown in an actual system may be different). This data 270a-c may then be encoded 230 via a SPEEX encoder 255 before being inserted 235 into a composite packet structure 240. Simultaneously, or in serial, the system may encode the same or a different portion of the audio 205, using a second codec, e.g., the ISAC codec. The system may extract 210 audio in preparation for ISAC 245 encoding. For purposes of explanation, this data may be organized into sets of, e.g., 30 byte data sets 265a, 265b. This data 265a, 265b may then be encoded 215 via an ISAC encoder 260 before being inserted 220 into a composite packet structure 240.

For purposes of explanation, the sequential content of the composite packet structure 240 is here depicted in left to right, top to bottom order (i.e., "SPX, 20, 20, 20, ISAC, 30, 30, comfort noise, etc."). The byte sequences labeled "SPX" and "ISAC" may inform a receiving device of the change in encoding format within the packet. For example, these byte sequences may indicate the character of subsequently stored bytes.

To facilitate integration of differently sized encoded byte sequences into a single packet, the system may anticipate the differences in the encoding types and their byte lengths. In this example, one encoding type presents 20-byte long segments of data while the other encoding type presents 30-byte long segments. The system may determine the lowest common shared multiple of these segment lengths (e.g., three 20-byte long segments share the same 60-byte footprint as two 30-byte long segments). In this example, the composite packet structure 240 may be such that successive 60-byte segments may be accommodated. Thus, in some embodiments, the composite packet may have all segments of one encoding, all segments of the other encoding, or a mixture (e.g., FIG. 2 reflects a composite mixture). Thus, a fixed packet size may be used containing a 60-byte multiple to facilitate compression during transmission in this example.

Thus, some embodiments allow one to change a number of audio frames packed into single RTP packet during a call. The number of audio frames may depend upon the estimated available bandwidth. The number of audio frames may be independent of the coding of frames with different codecs in some embodiments.

Figure 3:
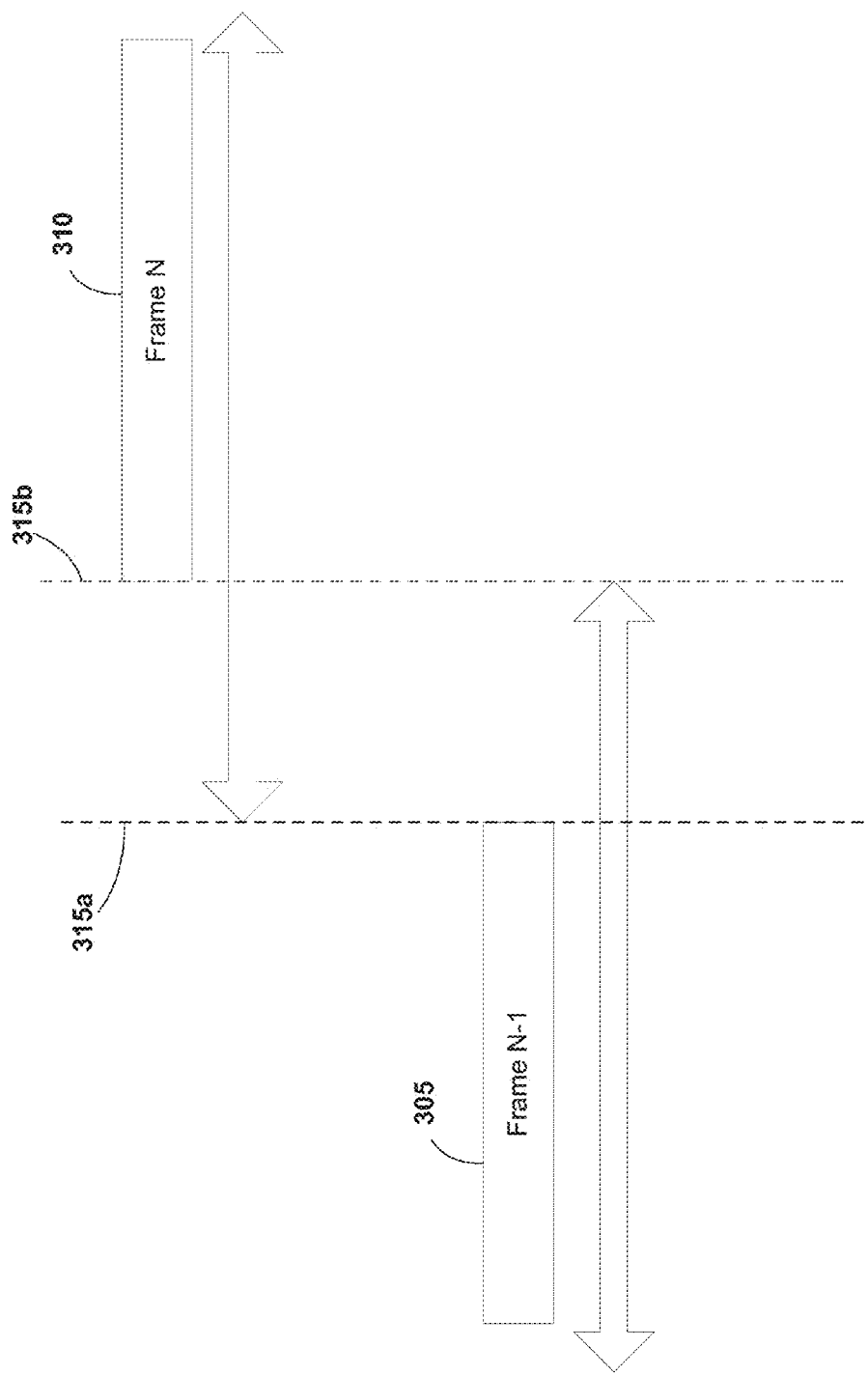
FIG. 3 is a timing diagram illustrating frame switching using a variable size packet format as may occur in some embodiments.

FIG. 3 is a timing diagram illustrating frame switching using a variable sized packet format as may occur in some embodiments. A delay, reflected by the period between time 315a and time 315b may be inserted between the encoding of successive frames 305 and 310. They delay may facilitate transitions between encoding types.

In some embodiments, a variable length, composite packet may include, e.g.: an ISPX RTP payload beginning with a payload version; a single payload with BWE index and information bits; two payloads with a BWE index and information bits; a single payload with a BWE index, information bits and RTT info; and two payloads with BWE index, information bits and RTT information.

Examples of codecs represented by a 2 bit ID that may be used include: ISAC, SPEEX, ISAC FEC, SPEEX FEC, etc. The RTP frame may include one or two codec fragments: SPEEX and ISAC or SPEEX/ISAC and FEC. In some embodiments, ISAC is always the second payload in the RTP frame/composite packet if two payloads are present.

In some embodiments, individual fragments do not have their own timestamps and may be assumed to be incremental to the RTP frame timestamp. In some embodiments, when several frames are aggregated into one payload for the RTP frame/composite packet it may be unclear how to detect the end of a frame and the beginning of the next frame. Padding inserted intermittently into the payload to test for more available bandwidth may complicate this issue. The recipient's decoder may know how to detect the end of an actual frame, but not the end of the appended padding. Various embodiments solve this problem in different ways for different encoding methodologies, e.g., SPEEX and for ISAC.

With regard to SPEEX, the system may ensure that the first bit of each frame of the RTP frame/composite packet is 1 (or any suitable distinguishing pattern). By making sure that all padding bits are 0 (or anything other than the pre-determined distinguishing pattern), the system may scan for the first 1 after the decoded frame (or the end of the payload), thereby finding the beginning of the next frame (as well as the padded length of each frame for BWE).

With regard to ISAC, it may not be possible to ensure that the first bit/byte of the payload, or indeed any of the bits or bytes, is nonzero. Unmodified ISAC may rely on each RTP packet containing only one ISAC frame and may consider all the bytes after the first frame to be padding. As a safety mechanism, some embodiments may encode the size of the non-data portion into the first byte of the padding (if such padding exists). Therefore, the missing information may only include whether the padding exists or not. But the existence of the padding may be inferred from whether the number of bytes used for decoding is less than the size of the RTP payload. The location, and number, of these bits may change according to the desired configuration. When there's only one payload, two bits may be used for padding information. The third frame's padding state may be inferred from whether or not there are any bits left after the third frame has been decoded (one will recognize that similar padding patterns may apply for different numbers of frames).

Figure 4:
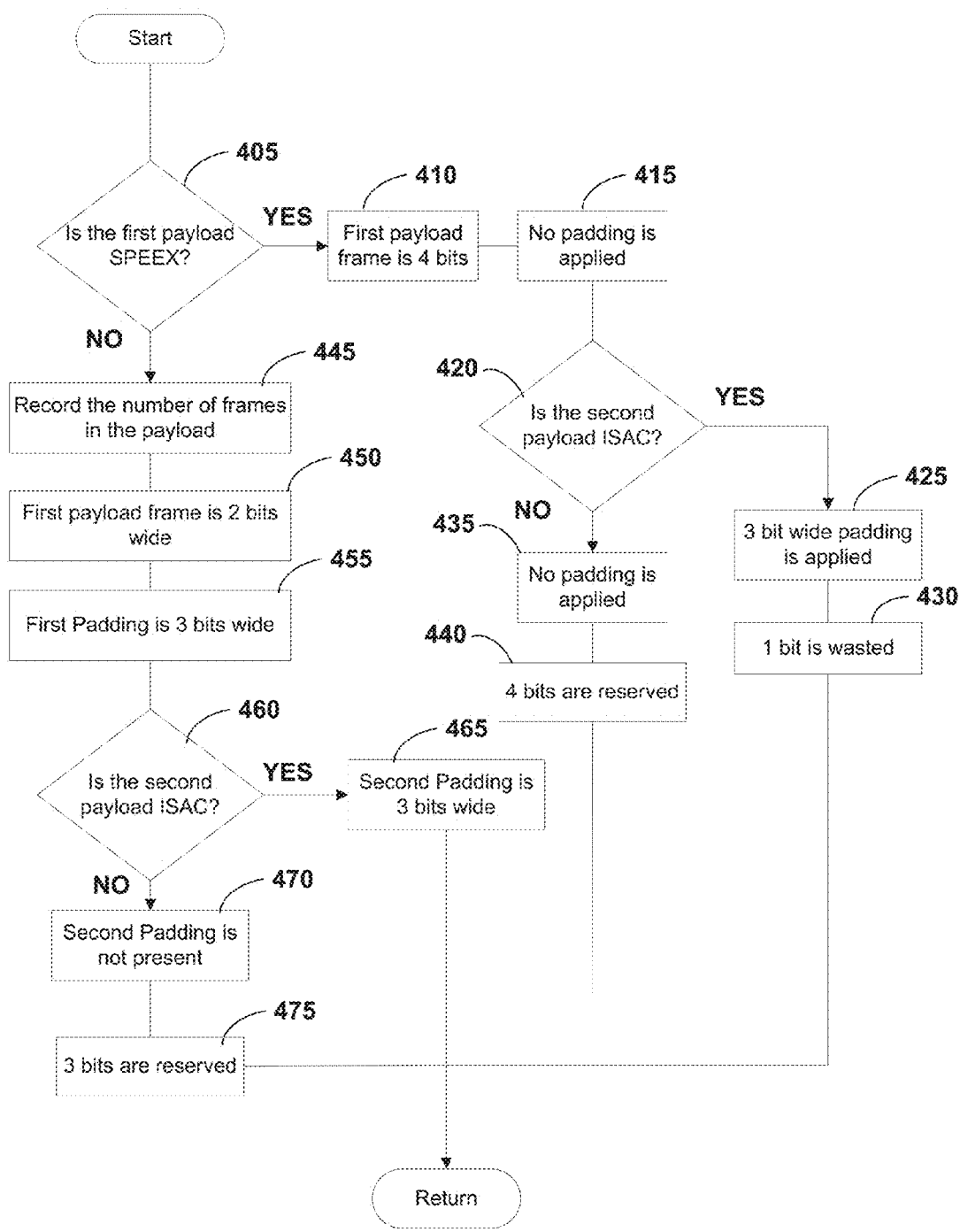
FIG. 4 is flow diagram illustrating a process for generating a composite packet as may be used in some embodiments.

FIG. 4 is flow diagram illustrating a process for generating a composite packet as may be used in some embodiments. Though example numbers of bits are provided for purposes of explanation in this example, one will recognize that alternative numbers of bits may be used. Similarly, though SPEEX and ISAC are depicted, one will recognize that alternative encoders may be applied. At block 405, the system may determine if the first payload to be inserted into the composite packet is SPEEX data. If so, the system may recognize the first payload frame to include four bits in the first payload frame at block 410 and no padding may be applied at block 415.

At block 420, the system may then determine if the second payload is ISAC data. If so, a three bit wide padding may be applied at block 425, and one bit set aside at block 430. Conversely, if the second payload is not ISAC (e.g., where both payloads are SPEEX data), no padding may be applied at block 435 and four bits may be reserved at block 440.

Where the first payload is not SPEEX data, e.g., where it is ISAC data, at block 405, the system may record the number of frames in the payload at block 445. The first payload frame may be recognized as two bits wide at block 450 and the first padding may be recognized as three bits wide at block 455. If the second payload is identified as being ISAC at block 460, the system may set the second padding to be three bits wide at block 465. Conversely, if the second payload is identified as not being ISAC (e.g., where it is SPEEX), then the second padding may not be present as indicated at block 470 and three bits may be reserved at block 475. In this manner, the pattern structure may facilitate a ready determination of the padding's character.

Figure 5:
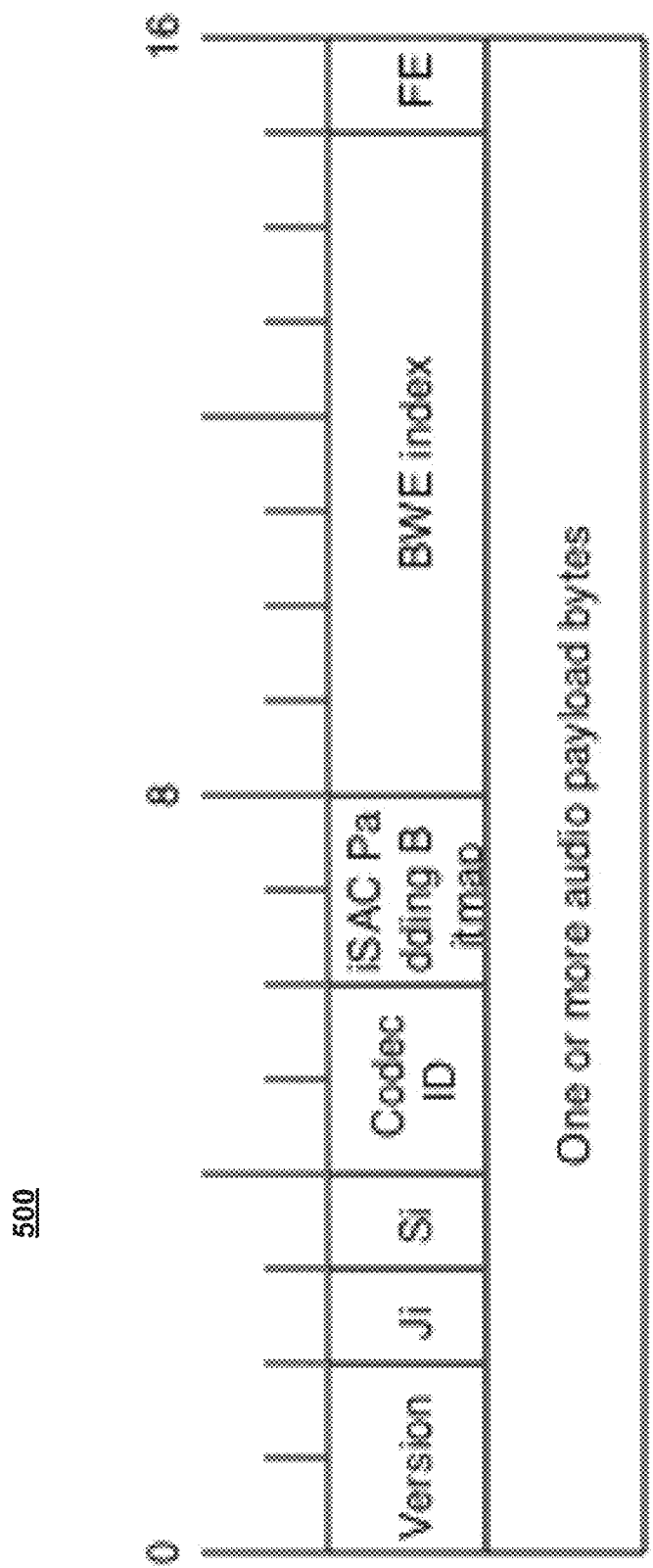
FIG. 5 is a packet diagram illustrating portions of an example packet having a single payload with a Bandwidth Extension (BWE) index and information bits as may be used in some embodiments.

FIG. 5 is a packet diagram illustrating portions of an example packet having a single payload with BWE index and information bits as may be used in some embodiments. In these examples, the codec independent BWE index is seven bits in length. The term "Ji" may refer to the jitter bit (reflecting packet jitter). "Si" may refer to the Silence bit. The Silence bit may be active only if all of the frames are silent and may be inactive if at least one frame isn't silent. "FE" and "FEC" may refer to the forward error correction bit(s).

Figure 6:
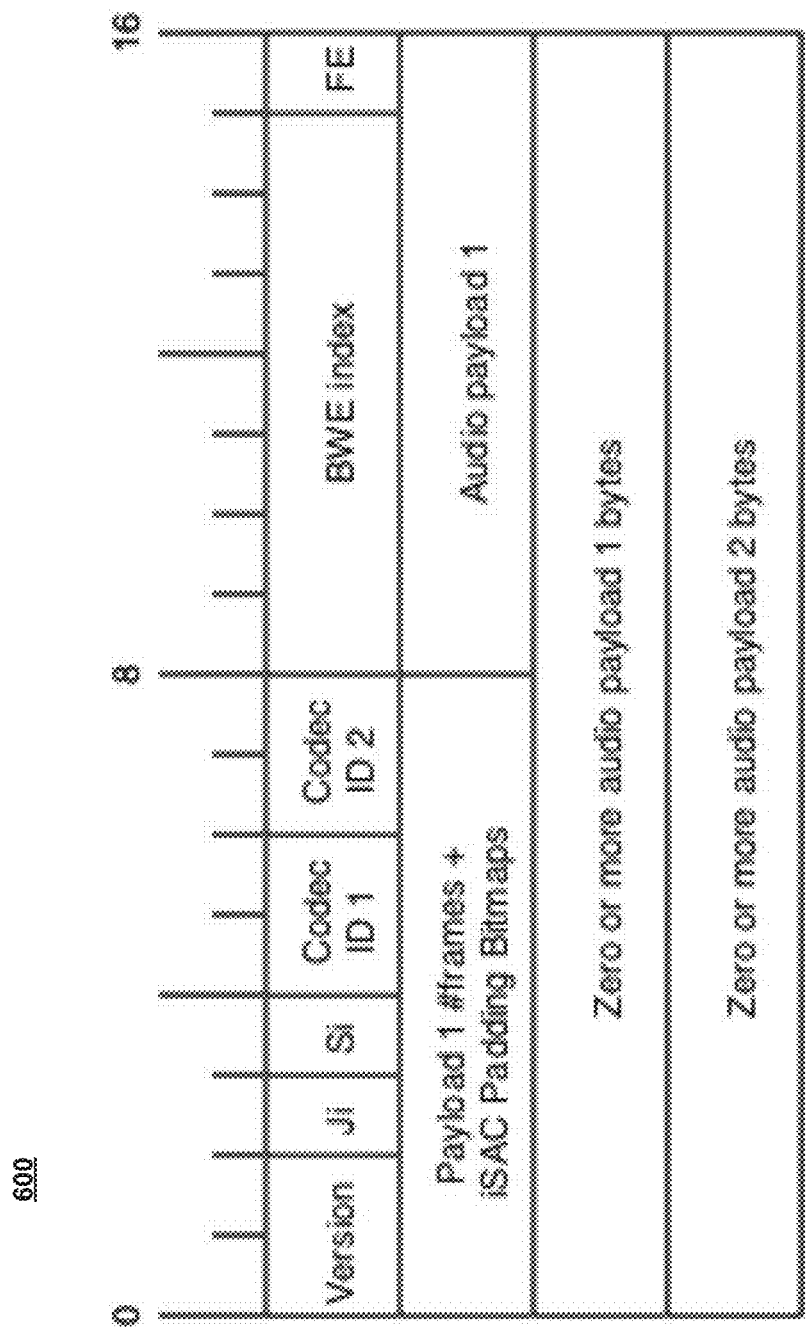
FIG. 6 is a packet diagram illustrating portions of an example packet having two payloads with BWE index and information bits as may be used in some embodiments.
Figure 7:
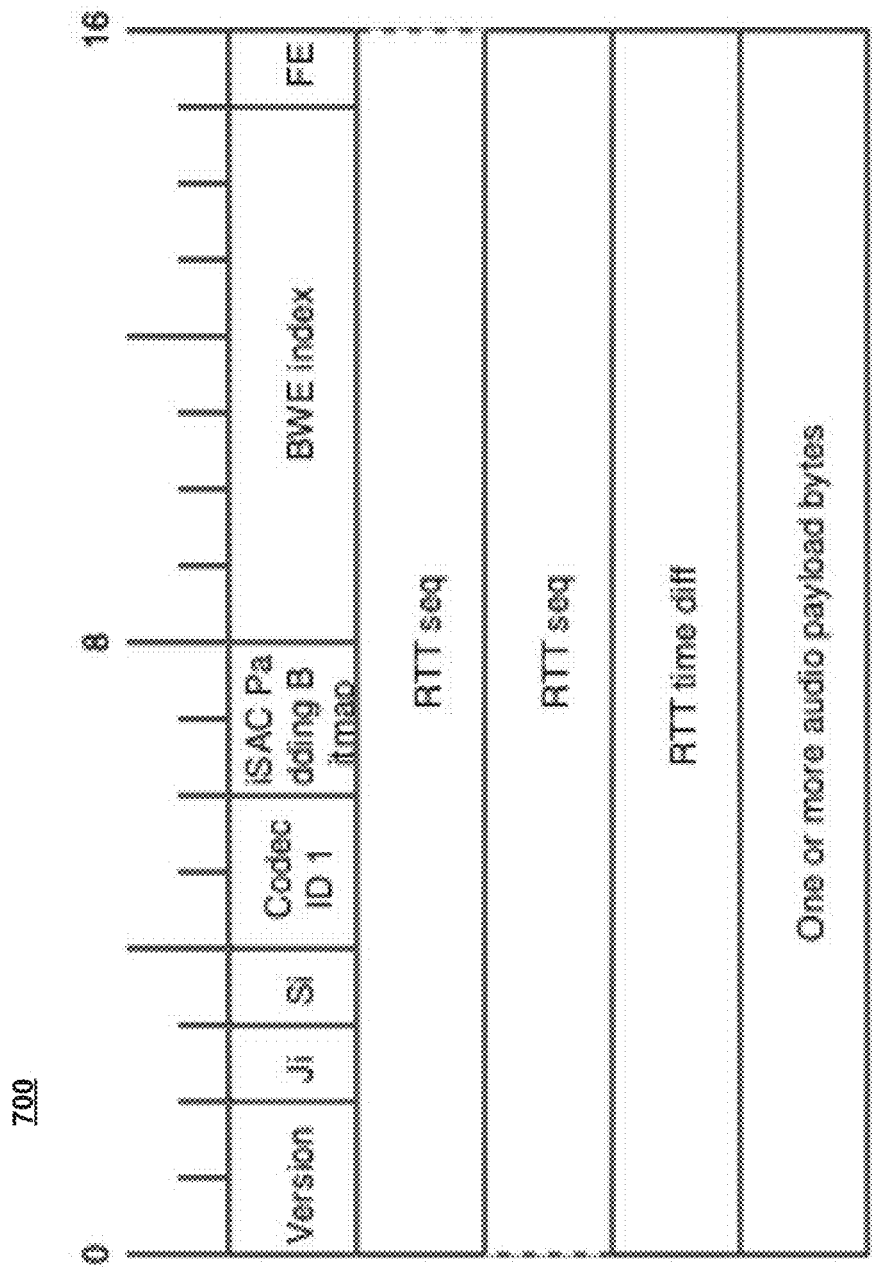
FIG. 7 is a packet diagram illustrating portions of an example packet having a single payload with BWE index, information bits, and Round-Trip delay-Time (RTT) information as may be used in some embodiments.
Figure 8:
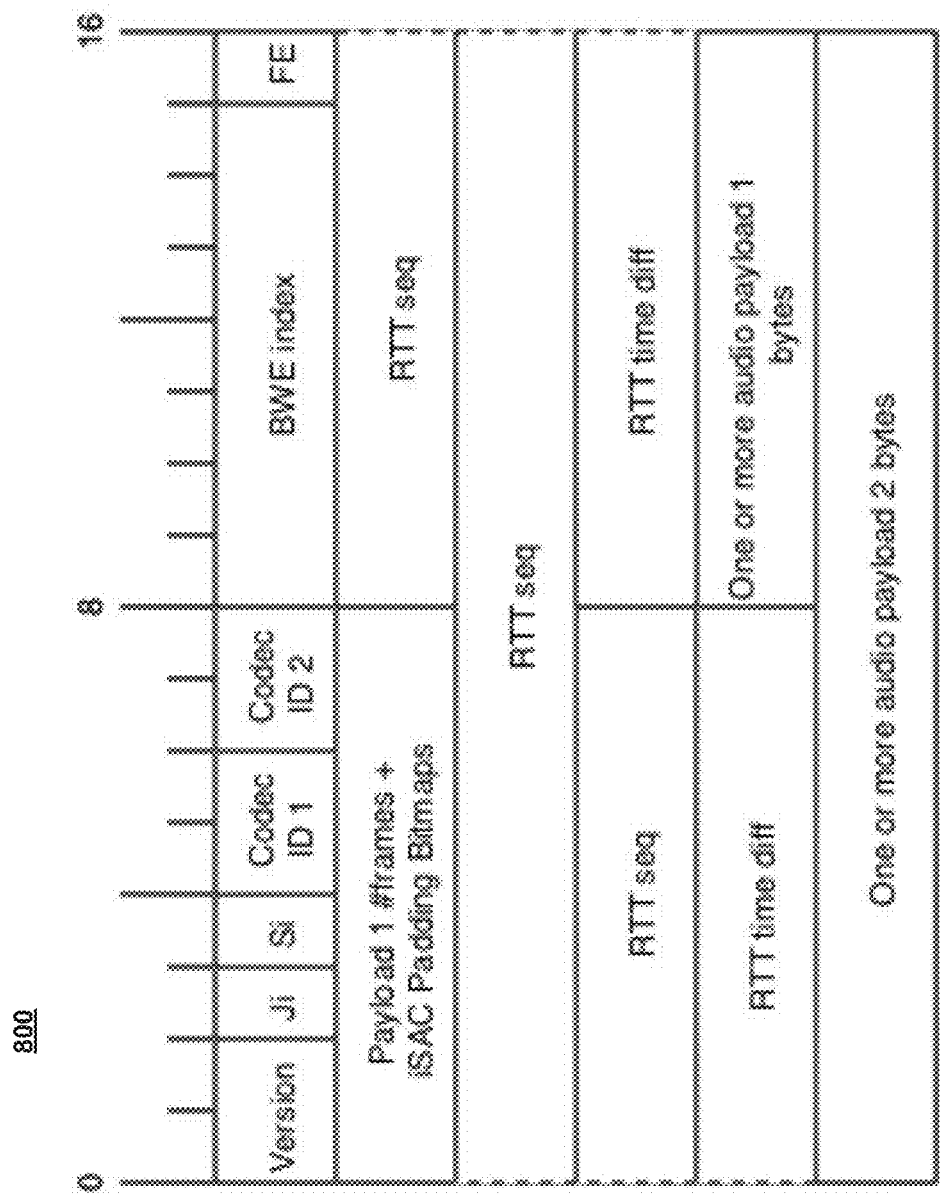
FIG. 8 is a packet diagram illustrating portions of an example packet having two payloads with a BWE index, information bits, and RTT information as may be used in some embodiments.
Figure 9:
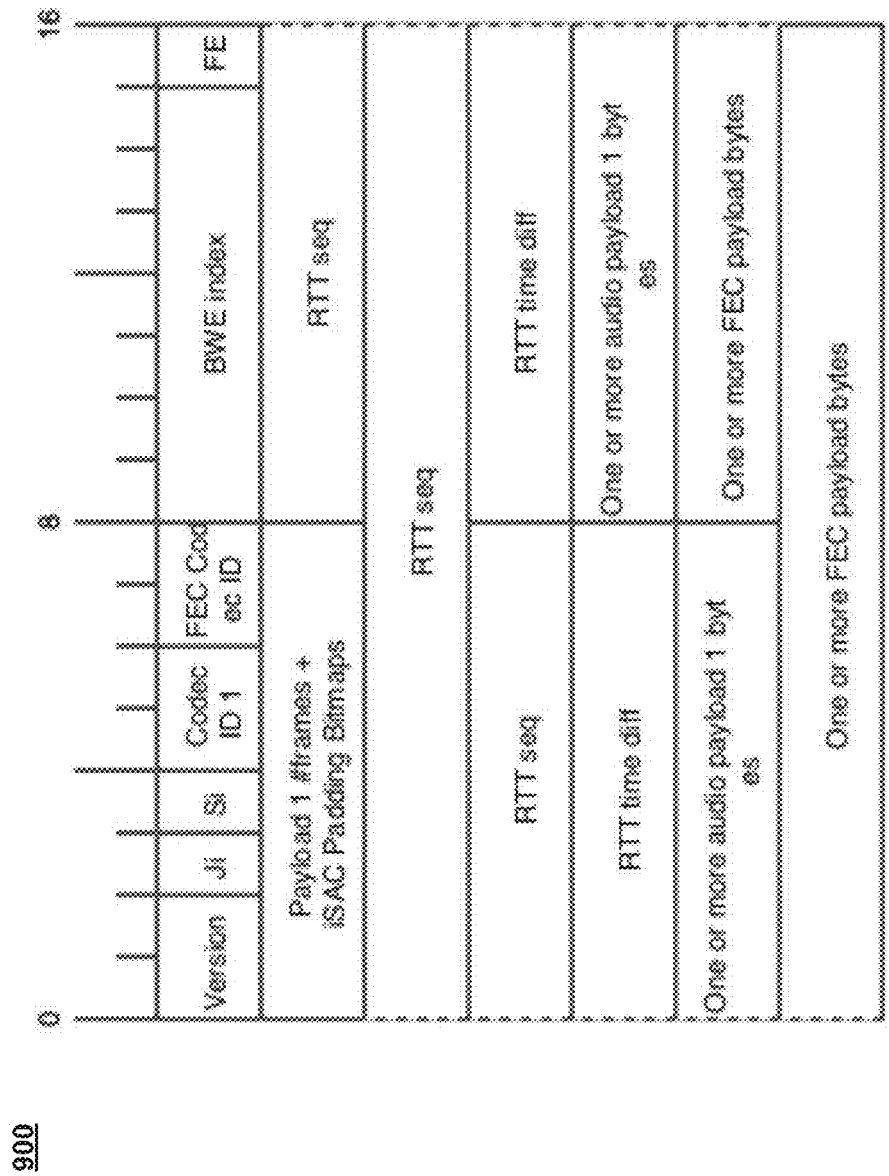
FIG. 9 is a packet diagram illustrating portions of an example packet having a main and Forward Error Correction (FEC) payload with BWE index, information bits, and RTT information as may be used in some embodiments.

FIG. 6 is a packet diagram illustrating portions of an example packet having two payloads with BWE index and information bits as may be used in some embodiments. FIG. 7 is a packet diagram illustrating portions of an example packet having a single payload with a BWE index, information bits, and RTT information as may be used in some embodiments. FIG. 8 is a packet diagram illustrating portions of an example packet having two payloads with a BWE index, information bits, and RTT information as may be used in some embodiments. FIG. 9 is a packet diagram illustrating portions of an example packet having a main and FEC payload with BWE index, information bits, and RTT information as may be used in some embodiments.

Comfort Noise Handling

Various of the disclosed embodiments enable managing and augmenting "comfort noise" during a network call, such as a Voice Over Internet Protocol (VOIP) connection. Particularly, traditional systems typically send machine-generated comfort noise, or a command to generate comfort noise at a recipient device, on a channel separate from the channel carrying the call's conversation content. Some embodiments reduce this overhead by embedding the comfort noise in the media stream or channel carrying the conversation content. In other embodiments, audio encoding is stopped at the source when the speaker (or other sound source) falls silent and the recipient, after detecting the cessation, generates white noise at its end. These approaches may be used in conjunction with a determination of the available bandwidth and channel parameters at any or all of the client devices involved in the network call.

Many conversations may include considerable amounts of time when, for example, neither individual speaks. During these periods of "silence", residual ambient sound may still be received at a non-speaking user device's microphone. Constant bitrate codecs may encode this data and transmit it, consuming bandwidth for data that generally need not be transmitted for the conversation to be understood. Users may be disconcerted if such ambient noise is simply replaced with complete silence. For example, complete silence may imply the connection has gone dead. Thus, e.g., the transmission of the amplified ambient recording, machine-generated pink noise, or a command to generate pink noise at the receiver end, may be employed.

In many prior art systems, these comfort noise packets (containing comfort noise or a command to generate comfort noise) are sent independently from the media stream. This independent transmission may add overhead and create a disjointed user experience. Various embodiments address this problem in at least two manners. First, some embodiments embed the comfort noise into the media stream itself, which decreases the per-packet overhead and may make the system more effective in low-bandwidth environments. In some embodiments, a single packet can include both audio data and also the comfort noise embedded within it (the packet may be adaptive in size as described in greater detail herein). Second, in some embodiments the source user device may actively stop encoding audio. The receiving user device may detect this silence and play comfort noise to its user in response. This may require even fewer packets and even less signaling traffic.

Figure 10:
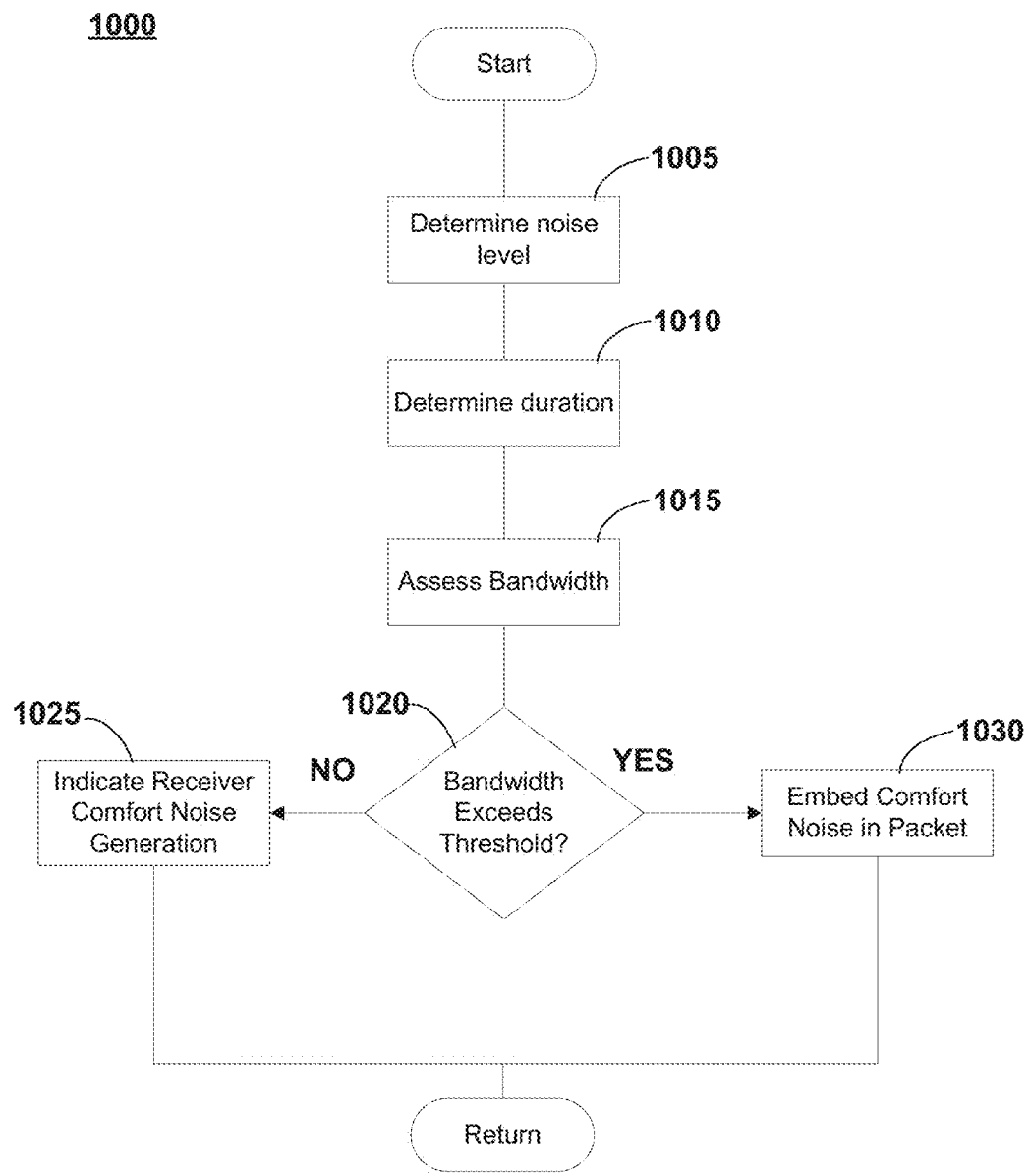
FIG. 10 is a flow diagram illustrating a process for including comfort noise with a data communication event as may occur in some embodiments.

FIG. 10 is a flow diagram illustrating a process for including comfort noise with a data communication event as may occur in some embodiments. The process 1000 may be run on a source user device sending data to a receiving user device. At block 1005, the system on the source user device may determine a noise level for the comfort noise. For example, the system may measure the quiescent signal received from an input at the user device when the user is not speaking.

At block 1010, the system may determine a duration at which comfort noise is to be generated or recorded. For example, the comfort noise may be transmitted or generated repeatedly at the source and/or receiving user device. The duration determination at block 1010 may determine the period of the comfort noise segment. The determination may be based upon the available bandwidth, the character of the comfort noise, user preferences, etc.

At block 1015, the system at the source user device may assess the bandwidth of the channel between the source and receiving user devices. As discussed above, latency may be a proxy for bandwidth. One will recognize that any suitable measure of bandwidth or an approximation of bandwidth may be used in various embodiments. Thus, at block 1015 the system may consider, e.g., the latency of previously transmitted packets.

While bandwidth may also be used to determine the character of the comfort noise at block 1005 and the duration at block 1010, it may also be used to determine the nature of the comfort noise's generation at block 1020. Particularly, at block 1020, the system may determine, e.g., whether the bandwidth exceeds a threshold. If so, the system may determine that generating the comfort noise locally and inserting it into a packet for transmission to the receiving device at block 1030 is the most appropriate action. This may relieve the receiving device of the processing burden of producing comfort noise using its own local resources and may instead impose a bandwidth burden on the transmission medium and a processing burden on the source device. The processing burden on the source device may be minimal where the comfort noise is generated using ambient noise recorded in real-time. The comfort noise, when generated at the source device, may be encoded in a standard audio packet and placed in succession with other packets carrying recorded user audio onto the media stream.

In contrast, when there is not sufficient bandwidth, e.g. as determined by some dynamic or pre-determined threshold, the system may determine at block 1020 that it is more efficient to impose the burden of generating the comfort noise upon the receiver user device at block 1025. A packet sent by the source device to the receiver device may contain a header, or portion of the packet's content, designated for indicating when the receiver device is to generate comfort noise, as well as the parameters for the comfort noise's generation. When the comfort noise is generated locally at the receiver device, the receiver may incorporate the receiving user's preferences during the generation.

Codec Selection

Various of the disclosed embodiments improve the initial codec selection in a Voice Over Internet Protocol (VOIP) connection. Particularly, rather than select an initial codec for the connection arbitrarily or based on data measured during the connection, embodiments analyze attributes of data exchanged prior to connection establishment to identify the appropriate initial codec. An "offer message" may initiate the call between sender and receiver. Attributes of the offer message transmission and acknowledgement may be used to infer channel quality. Signal strength, the existence of a WiFi connection, previous codecs used, etc., may also be taken into consideration. Latency measurements may be used as a proxy for measuring available bandwidth. Based on these factors, a codec having appropriate attributes may be selected. Traditional rate shaping methods may be applied subsequent to the initial codec selection.

Some prior art systems may arbitrarily select an initial codec for the connection (e.g., a default codec). Once the communication begins, these systems may assess whether the codec is suitable, or if another codec should be substituted. However, this approach often results in a suboptimal codec handling the initial portion of the call. The initial portion of the call may include very important introductory communications (e.g., a caller may establish the context or purpose of the call in the initial moments). Other prior art systems may attempt to dynamically select a more appropriate codec during the connection. While this may improve the call later during the connection, it does little to solve the problem of initially selecting a proper codec for initial use.

Accordingly, some embodiments consider attributes of data exchanged prior to connection establishment to infer the appropriate initial codec. For example, the latency of the offer message transmission and acknowledgement for establishing the connection may be used to infer channel quality. The latency may be used as a proxy by which to infer the available bandwidth. For example, high latency networks (e.g., as determined from an RTT assessment) may imply low bandwidth, etc. Signal strength, the existence of a WiFi connection, previous codecs used, etc., may also be taken into consideration. Other factors considered may include, e.g.: the time taken to connect to a signaling channel; chat message latencies; the user device's connectivity state; the historic usage of the user device; user ratings; a number of lost packets; and, server mined data on calls made by other users on similar devices or in similar network conditions. Based on some or all of these factors, a codec having appropriate attributes may be selected. Traditional rate shaping methods may be applied subsequent to the initial codec selection.

Various embodiments may use a non-media packet, referred to herein as the "offer" or "proposal", which may be sent from one user's device to another user's device, to infer which codec should be used. An offer that takes a relatively long time to arrive at the receiving user device (as controlled for factors such as network hops, etc.) may imply that there is low bandwidth available and that a lower bandwidth codec configuration should be applied for at least an initial portion of the call. Conversely, if the offer is delivered quickly, a higher bandwidth codec configuration may be used.

By assessing conditions prior to the initial codec selection, the system may achieve a better initial connection and reduce the time to arrive at a stable connection to only seconds or milliseconds. Traditional rate shaping may still be applied following the initial codec selection, but the initial call is more likely to be established in high traffic environments, rather than being dropped in view of the limited bandwidth.

Figure 11:
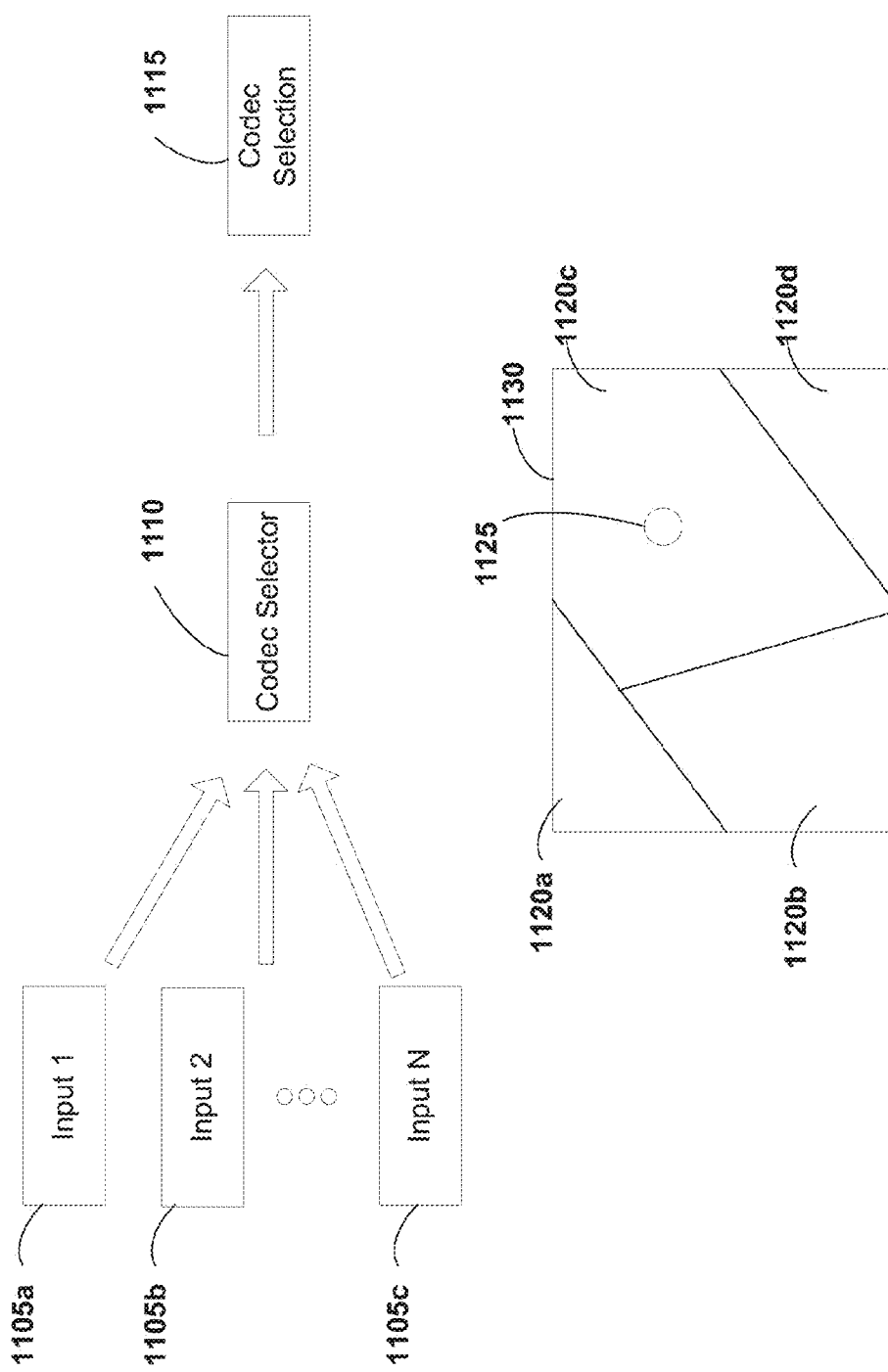
FIG. 11 is a block diagram illustrating an example processing topology for selecting a codec as may occur in some embodiments.

FIG. 11 is a block diagram illustrating an example processing topology for selecting a codec as may occur in some embodiments. A variety of inputs 1105a-c, including, e.g., the latency of the offer packet, the locations of the user devices, the preferences of the users (such as the minimum acceptable quality), etc. may be provided to the codec selector 1110. The codec selector 1110 may reference a multidimensional space 1130 reflecting a codec assignment for different collections of input values. Though visually depicted here in two dimensions to facilitate understanding, one will recognize that the actual system may include many more dimensions. One or more codecs may be assigned to each of regions 1120a-d. The incoming data inputs 1105a-c may be used to determine a corresponding position 1125 in the multidimensional space. Here, the initial codec 1115 may be selected from the one or more codecs associated with the region 1120c.

Figure 12:
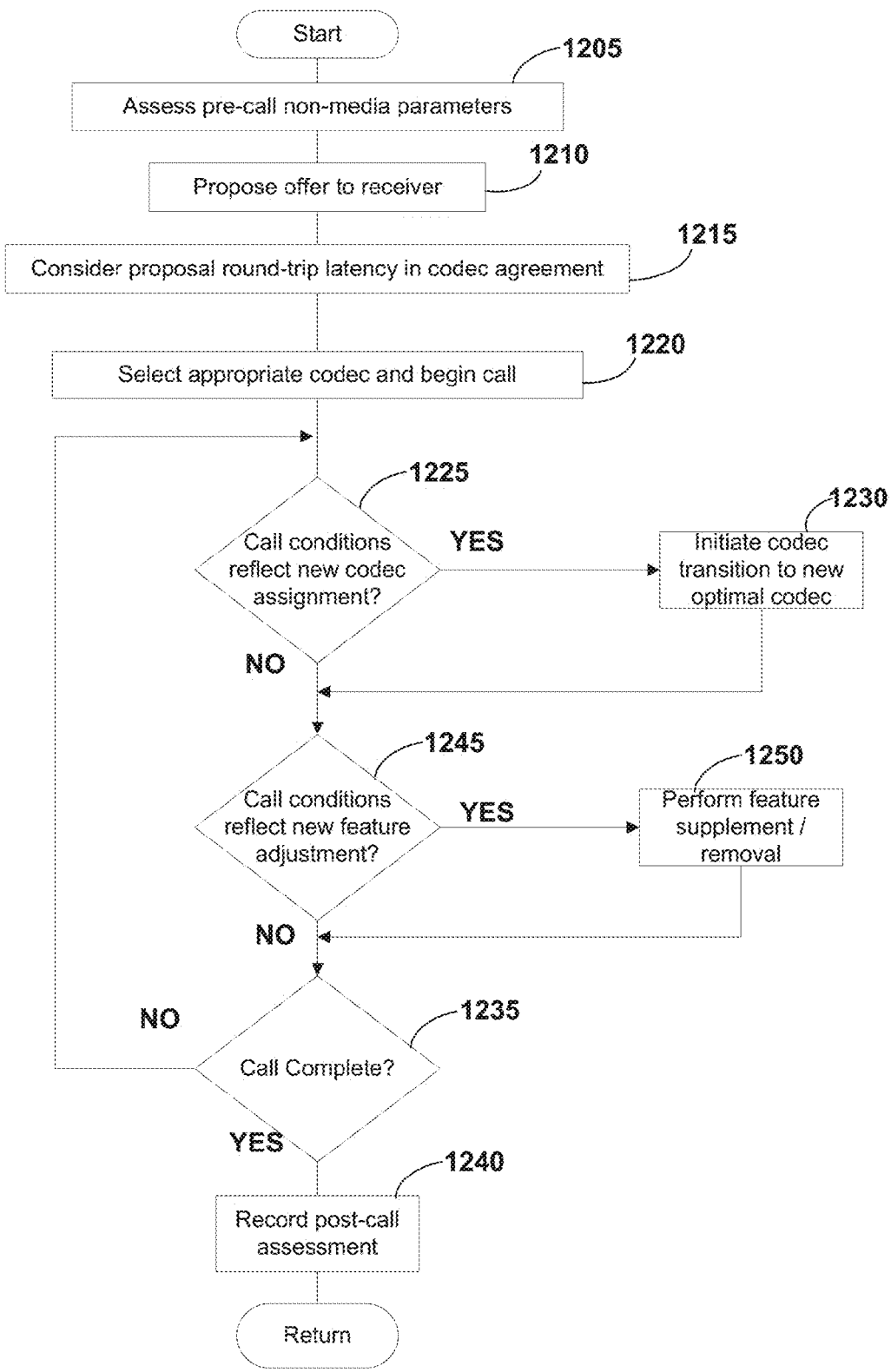
FIG. 12 is a flow diagram illustrating aspects of initial codec selection and call handling as may occur in some embodiments.

FIG. 12 is a flow diagram illustrating aspects of initial codec selection and call handling as may occur in some embodiments. At block 1205, the system operating on one or more user client devices and/or at a server may assess the pre-call, non-media parameters. For example, the system may gather input data regarding the preferences of the users, the latency of past communications, etc.

At block 1210, a source user device may transmit an offer message to the receiving user device to initiate the call. The receiving user device may provide a response, reflecting the round-trip time taken to receive the packet (e.g., the difference between the time at which an offer was sent and an acknowledgment was received). At block 1215, the source user device may include the round trip time in its assessment.

At block 1220, the source device may select an appropriate codec based upon the input information and may begin the call. At block 1225, the system may determine whether the call conditions reflect that a new codec assignment is to be made, and if so, at block 1230, the codec configuration may be adjusted. Where the system is consistently adjusting the codec once the call is initiated, or where the call is being consistently dropped shortly after initiation, the system may make a record for subsequent consideration at block 1205 in a subsequent call. This record may avoid repeated selection of an initial codec that is not appropriate given unseen (and/or unknowable) characteristics of the communication space. At blocks 1245 and 1250 the system may also consider whether features should be supplemented or removed (note that this may occur before the call conditions are assessed for codec reassignment in some embodiments, to economize the codec analysis). For example, where the channel quality has degraded, the system may remove video support, so that at least audio communication may continue at an acceptable level. When conditions improve, the video support may be rejoined (in some embodiments video, or other features, rather than audio may be preserved).

At block 1235, the system may determine if the call is complete. If the call is complete, at block 1240, the system may record a post-call assessment, reflecting the usage and viability of the codecs employed throughout the call. This information may also be used at block 1205 in a subsequent call for the initial codec determination.

Decoupled Audio and Video

Various disclosed embodiments improve audio and video quality in a network call, such as a Voice Over Internet Protocol (VOIP) connection that includes both audio and video. Particularly, different audio and video codecs may be used and parameters assigned based upon the context in which the communication occurs. For example, audio quality may take precedence over video quality when discussing a matter in a chatroom. Conversely, video quality may take precedence over audio quality when playing a collaborative video game. VP9 may be used to encode video, while a combination of ISAC and SPEEX may be used to encode audio. Bandwidth determinations for each channel may also influence the respective codec selections.

In the last few years, the Internet Protocol (IP) has emerged as a packet format in which data, audio and video traffic is carried around wired or wireless communication networks. Devices communicating via a communication network such as an IP based network often tend to have hardware and software platforms that are developed by different vendors. In order to ensure interoperability between these hardware and software formats, several industry standards have been adopted. These standards often prescribe a sequence of messages to be exchanged and the corresponding message formats to establish a two-way communication and to exchange multimedia data between two end points of communication for achieving acceptable user experience.

While the industry standards often provide acceptable performance, this performance may come at the cost of reduced flexibility. For example, industry standards published by organizations such as International Telecommunications Union (ITU) and International Standards Organization (ISO) provide formats for digitally compressed audio and video information. For example, ISO has published a video encoding specification called MPEG/AVC (Moving Pictures Expert Group, Advanced Video Coding) and a corresponding audio specification called Advanced Audio Coding (AAC). The combination of MPEG/AVC video and AAC audio is currently ubiquitously used for carriage of audio-video data over the Internet.

While the above-mentioned audio and video compression codecs often provide acceptable user experience, such may not always be the case. In general, the quality of audio or video that is achieved by a given audio codec and video codec varies with the operational conditions such as bitrate, packet errors, type of source, e.g., natural voice or artificial voice, natural images or computer generated image, and so on. A number of different codec ae known in the art, each codec having its associated strengths and weaknesses. For example, a number of different audio codecs, e.g., AAC, SPEEX, ISAC, Ogg Vorbis, can be used for encoding audio. Similarly, for video encoding, H.264, MPEG/AVC, VP9, VC-1, etc., present example video codecs that may be used. Further, some codecs provide a rich set of operational parameters that can be used to obtain different quality streams. For example, MPEG/AVC can be used at different bitrates, profiles (e.g., codec and transmission configurations) and using (or not using) different encoding parameters such as using (or not using) Bi-directionally encoded frames, using (or not using) intra-encoded frames, and so on. With a pre-determined pairing of an audio code and video codec for use during a multimedia session, it may not be possible to mix-and-match the best codec for a given operational point or be able to use a given codec at its best encoding setting for a given operation.

Figure 13:
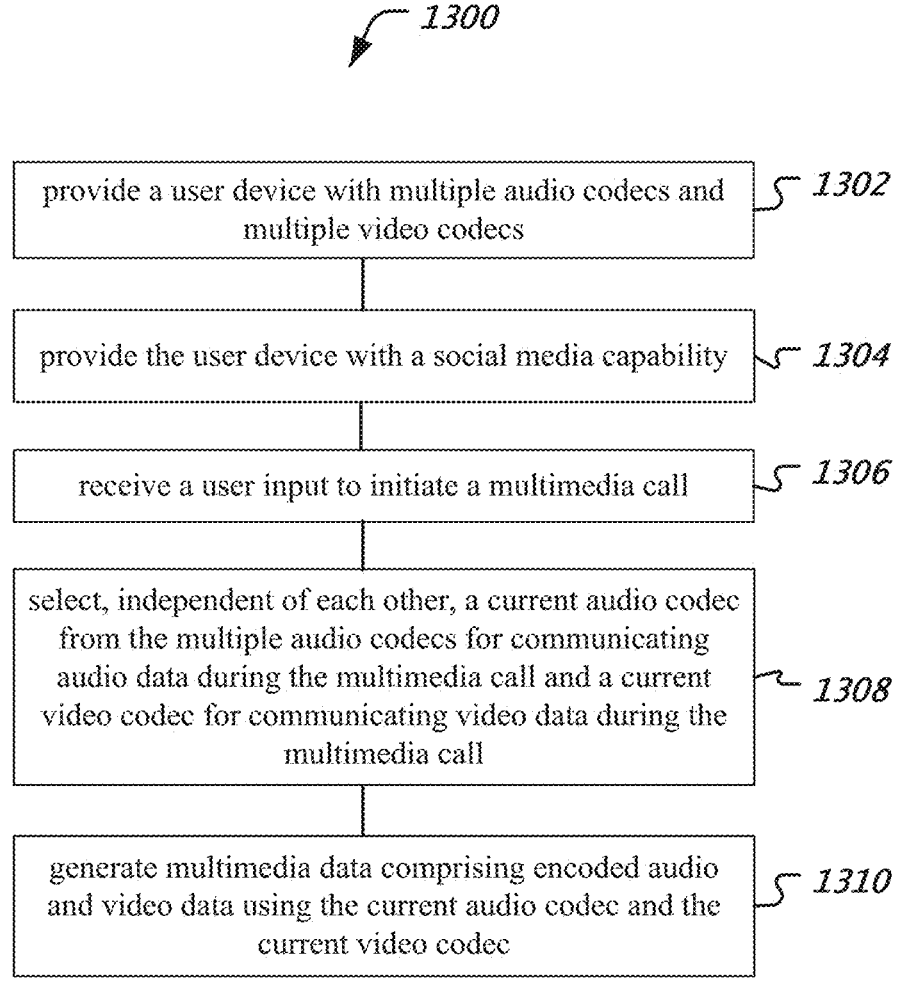
FIG. 13 is a flow diagram depiction of an example method of multimedia communication as may occur in some embodiments.

Embodiments disclosed in the present document can be used to achieve the above-discussed operational advantages, and others. The disclosed embodiments of systems and methods can be used for improving quality in a Voice Over Internet Protocol (VOIP) connection including both audio and video content. Particularly, different audio and video codecs may be used and parameters assigned based upon the context in which the communication occurs. For example, audio quality may take precedence over video quality when discussing a matter in a chatroom. Conversely, video quality may take precedence over audio quality when playing a collaborative video game. VP9 may be used to encode video while a combination of ISAC and SPEEX may be used to encode audio. Bandwidth determinations for each channel, audio or video, may also influence the respective codec selections FIG. 13 shows a flowchart of an example method 1300 for carrying on a multimedia communication session, e.g., from a user device that is generating multimedia data.

At 1302, the method 1300 includes providing a user device with multiple audio codecs and multiple video codecs wherein each audio codec generates encoded digital audio in a corresponding digital format and each video codec generates digital video in a corresponding digital format. For example, in some embodiments, a user device such as a mobile phone or a computer may be sold by pre-installing multiple audio and video codecs and/or corresponding hardware with codec encoding or decoding capability on the user device. Alternatively or additionally an application may be installed by a user or the user may be prompted to install one or more codecs either individually or as a bundle.

At 1304, the method 1300 includes providing the user device with a social media capability, wherein the social media capability allows for establishing a multimedia session with another user device. In various embodiments, the social media capability may be based on installation of a software application and/or hardware and/or a combination of software and hardware that allow a user to generate, create, and maintain a list of friends or contacts with whom the user can share data. The social media capability, or the social media app, may in turn interact with the multiple media codecs installed on the user device for the use of a selected codec for receiving and sending audio and/or video data during a communication session.

At 1306, the method 1300 includes receiving, at a user interface, a user input to initiate a multimedia call using the social media capability with another user device. For example, when a user wants to initiate a multimedia session or a multimedia call with another user, he may select the other user's name from a list of friends and direct the user device to start an audio or an audio/video call with the other user.

At 1308, the method 1300 includes selecting, independent of each other, a current audio codec from the multiple audio codecs for communicating audio data during the multimedia call and a current video codec for communicating video data during the multimedia call. When the multimedia call is being established, the user device may make a determination of what audio codec to use for the call and what video codec to use for the call. These two decisions may be independent of each other. In other words, unlike some prior art systems such as the MPEG/AVC and AAC codec combinations, any audio codec may be used along with any other video codec, as described in further detail below.

At 1310, the method 1300 includes generating multimedia data comprising encoded audio and video data using the current audio codec and the current video codec. The audio/video data may then be transmitted via a network interface over the network to another user device.

In some embodiments, the method 1300 further includes monitoring one or more operational conditions during the multimedia call for making a determination about whether or not to change the current audio codec or the current video codec. The monitored conditions may include, e.g., bandwidth available over the network, packet loss or error rate, packet delay, type of content being sent by the user, and so on. For example, the method 1300 may maintain information about the effectiveness of each audio and video codec as a function of the operational parameters being monitored. For example, a video codec C1 may be less sensitive to packet loss than another video codec C2. In other words, end-user perceived video quality may remain at a satisfactory level in spite of packets being lost when transmitted over the network. Thus, if the measured packet error loss of the network goes above a pre-determined threshold (e.g., 10% packet loss rate during some period of time), then the method 1300 may decide to switch from the currently being used video codec C2 to the more robust video codec C1. Because the decision about which video codec is to be used and which audio codec is to be used are independent of each other, this change from video codec C2 to video codec C1 may not be accompanied by a corresponding codec change for the audio data.

In some embodiments, the method 1300 may further include applying, when it is determined to change the current audio codec or the current video codec, a predetermined rule for selecting the codec or codecs to be changed. To change the codec being used, the method 400 may wait until a next "pause" point in the media generated at the user device. This pause point may be, e.g., a silent period in locally generated audio such as speech or may be an intra-encoded frame (e.g., an I-frame) of video or a detected scene change in the video.

In some embodiments, the method 1300 includes changing from using the current audio codec to using a next audio codec during the multimedia call without changing the current video codec. Alternatively or additionally, the method 400 includes changing from using the current video codec to using a next video codec during the multimedia call without changing the current audio codec.

In some embodiments, the method may include notifying of the change, via a message transmitted prior to the changing, to the other user device. In some embodiments, the pre-determined rule for selecting the codec to be changed is shared by both the user device and the another user device. In such a case, the method 400 may further include changing, without providing an advance notification from the user device to the another user device, from using at least one of the current audio codec and the current video codec to a next audio codec or a next video codec.

The method 1300 may further include operating the user device to maintain a history of codec changes, and applying a hysteresis in the determination about whether or not to change the current audio codec or the current video codec, whereby no change is made when a previous codec change occurred within a preceding threshold interval of time. In some embodiments, the hysteresis is applied only to audio codec changes and not applied to video codec changes.

Figure 14:
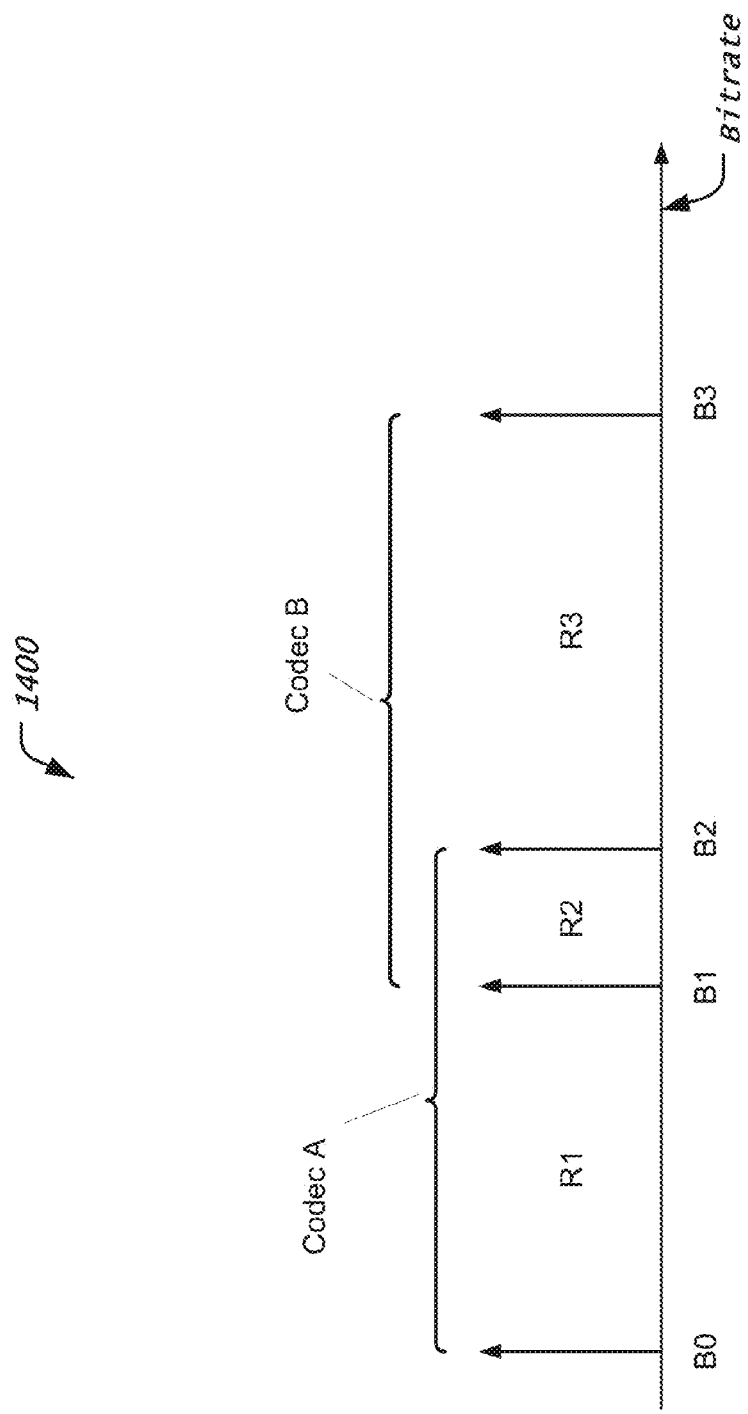
FIG. 14 is a flow diagram depiction of an example method of multimedia communication.

FIG. 14 illustrates an example 1400 of how operational parameters can be used for codec selection. For a given media type (audio or video), Codec A may be the preferred choice of encoding when the operational condition is such that a bitrate between B0 and B2 can be allocated to the codec. In an overlapping range B1 to B3 (where B1 is less than B2, but B3 is greater than B2), codec B may be the preferred codec for encoding media content. Thus, when the operational condition is in the range R1 (between B0 and B1), then codec A may be selected. Similarly, when the operating range is R3 (between bitrates B2 and B3), Codec B may be selected. In the range R2, it may be possible to select either codec A or codec B, e.g., because both codecs give similar performance. In such as case, in some embodiments, preference may be given to keep using the codec currently in use. For example, Codec A may be used in the range R2, if codec A was being used based on a previous operational condition. Alternatively or additionally, in some embodiments, a hysteresis time period may be used before a change of codec is made. For example, no codec change is made in the region R2 if the last change occurred within a pre-determined time period (e.g., 10 seconds), before the present time. Otherwise, a codec change is made to keep up with changes in the network conditions.

Figure 15:
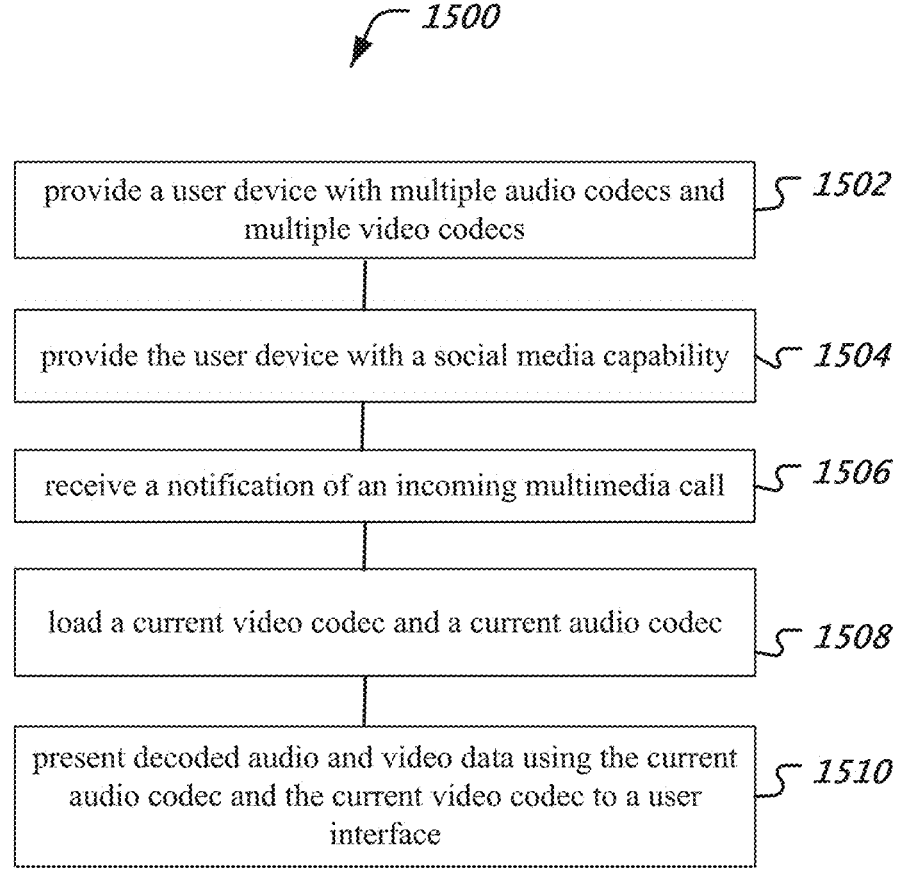
FIG. 15 shows an example codec selection process as a function of available bitrate.

FIG. 15 shows a flowchart of an example method 1500 for operating a multimedia session. The method 1500 may be implemented at a user device that is on the receiving side of a codec change performed by the transmitting side of the multimedia session.

At 1502, the method 1500 includes providing a user device with multiple audio codecs and multiple video codecs wherein each audio codec decodes encoded digital audio having a corresponding digital format and each video codec decodes digital video having a corresponding digital format.

At 1504, the method 1500 includes providing the user device with a social media capability, wherein the social media capability allows for establishing a multimedia session with another device;

At 1506, the method 1500 includes receiving, over a network interface, a notification of an incoming multimedia call using the social media capability from another user device, wherein the notification identifies, independent from each other, a current audio codec and a current video codec for use during the multimedia call;

At 1508, the method 1500 includes loading the current video codec and the current audio codec to decode received audio and video data during the multimedia call; and At 1510, the method 1500 includes presenting decoded audio and video data using the current audio codec and the current video codec to a user interface.

In some embodiments, the method 1500 may further include determining, during the multimedia call, that the encoding format for at least one of audio and video received during the multimedia call has changed, unloading, in response to the determination that the encoding format has changed, at least one of the current video codec and the current audio codec, and loading a corresponding next codec to seamlessly provide multimedia data at the user interface. In some embodiments, the determining operation includes receiving a notification from the another user device of a change in encoding format.

In some embodiments, the method 1500 includes monitoring one or more operational conditions during the multimedia call for making a determination about whether or not to change the current audio codec or the current video codec. The loading operation may include changing from using the current audio codec to using a next audio codec during the multimedia call without changing the current video codec. Alternatively or additionally the loading operation may include changing from using the current video codec to using a next video codec during the multimedia call without changing the current audio codec.

In some embodiments, a user device apparatus may include a memory, a processor and a network interface. The memory stores processor-executable code include code for multiple audio codec and multiple video codecs wherein each audio codec generates encoded digital audio in a corresponding digital format and each video codec generates digital video in a corresponding digital format. The processor reads code from the memory and implements a method including implementing a social media application, wherein the social media application allows for establishing a multimedia session via the network interface with another user device, receiving, from a user interface, a user input to initiate a multimedia call using the social media capability with another user device, selecting, independent of each other, a current audio codec from the multiple audio codecs for communicating audio data during the multimedia call and a current video codec for communicating video data during the multimedia call, and generating multimedia data comprising encoded audio and video data using the current audio codec and the current video codec. The apparatus may also monitor one or more operational conditions (e.g., those discussed above) during the multimedia call for making a determination about whether or not to change the current audio codec or the current video codec. The apparatus may also apply, when it is determined to change the current audio codec or the current video codec a pre-determined rule for selecting codec to be changed.

In some embodiments, the pre-determined rule for selecting a codec to be changed is shared by both the user device and the another user device. In such a case, the apparatus may change, without providing an advance notification from the user device to the another user device, from using at least one of the current audio codec and the current video codec to a next audio codec or a next video codec.

In will be appreciated that various techniques for providing best quality audio video experience to users during a multimedia session have been disclosed. In some disclosed embodiments, the selection of an audio codec and a video codec may be performed independent of each other. The selection of a particular codec may be based on a type of multimedia session that is currently underway.

Embedded RTCP

Various disclosed embodiments reduce the impact of RTCP overhead by including RTCP information in the media packets themselves. The values in the RTCP headers may be selected based on the context and organized in a unique format for transport in the media packets. For example, RTT, packet loss, and bandwidth estimates may dictate when and how RTCP data is moved into the media packet. An interface may be provided for extracting the data so that clients may easily integrate the embodiments with existing RTCP-based systems. Inclusion of the RTCP information in the media packet may increase the media packet size, which may be anticipated in bandwidth assessments and accommodations.

In one example aspect, a disclosed communication method includes establishing a multimedia communication session from a first communication node to a second communication node, wherein the multimedia communication session is conducted via a communication network using a communication protocol, determining, based on a revision number of the second communication node, whether the second communication node supports a mixed media transmission mode in which media packets include control information, and transmitting, when the second communication node supports the mixed media transmission mode, a plurality of media packets comprising media data from the first communication node to the second communication node at a given rate of packet transmission. The at least some of the plurality of media packets are mixed media packets which include digitized media data that is captured at a user interface of the first communication node and further include quality information indicative of a quality of data packets received during the audio communication session from the second communication node within a time window of an observation duration.

Certain aspects of the disclosed technology are described with specific references to the Real Time Protocol, which is generally specified in Internet Engineering Task Force (IETF) Request for Comments (RFC) 1889, and further revised in RFC 3550 for illustrative purpose. The disclosed technology can be embodied, however, in implementations that use different packet formats.

In the media streaming protocols defined by RTP, including RTP Control Protocol (RTCP), packets are transferred between two or more end points in a communication network using IP transport format. The RTP specification defines a header field and a payload field for each packet. The RTP header includes information such as a sequence number, a timestamp, a source identifier, payload type, and so on. In typical implementations, RTP header has a size of at least 12 bytes.

To help facilitate a satisfactory audio or video communication session using the RTP protocol, end points may be configured to exchange certain control information using the RTCP. Typically, RTCP information is carried in separate IP packets than RTP packets. For example, IETF RFC 3605 prescribed using separate User Datagram Protocol (UDP) port IDs for RTP and RTCP packets—typically an even numbered ID for RTP, and the immediate next odd number for the corresponding RTCP port ID. An RTCP packet follows the general format of the RTP packet, but instead of the payload portion carrying media data, an RTCP payload carries reception report information. The information included in an RTCP packet sent from a receiver node of a media stream to the transmitter node of a media stream is intended to help the transmitter node to provider a better quality of user experience to the receiver. Using the RTCP report, the transmitter node may be able to adjust the bitrate of encoding, the rate at which RTP packets are sent out, the size of RTP packets, and so on.

Figure 16:
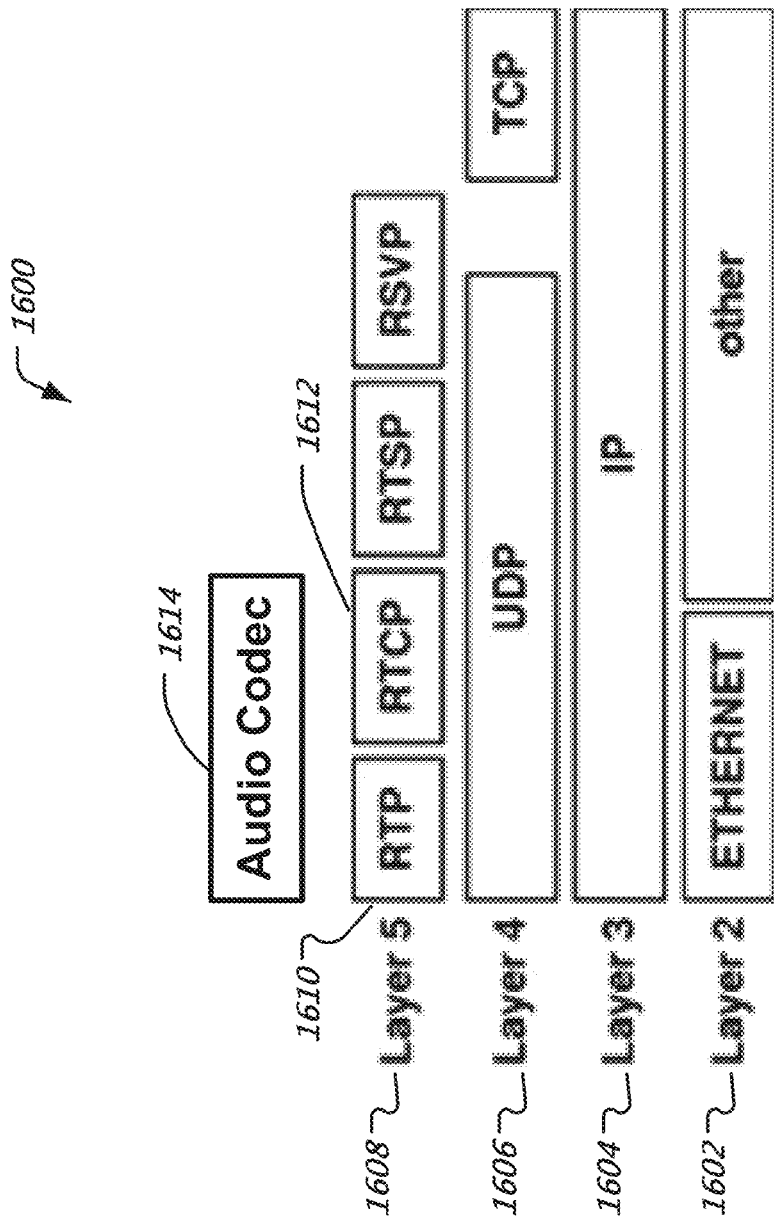
FIG. 16 shows an example of a transmitter-side protocol stack.

FIG. 16 depicts an example of a protocol stack embodiment 1600 at a transmitting or a receiving node (e.g., from users 105*a-c*) at which media based on RTP and RTCP protocols is received or transmitted. On the receiving side, at layer 2 (1602), data received on physical signals (e.g., electrical or optical transmissions) may be processed using a protocol such as Ethernet, or a wireless transmission protocol. From the data received at layer 2, IP packets may be recovered and processed at layer 3 (1604). The received IP packets that are UDP packets may be parsed and processed at layer 4 (1606). UDP packets that correspond to port IDs that are used in a current media session may be passed to the appropriate processing RTP or RTCP modules 1610, 1612 operating at layer 5 (1608). Audio data may be extracted from the RTP packets and passed to the audio codec module 1614 for decoding and presentation to a user interface (e.g., playing out from a speaker, or providing to a voice-to-text application).

Figure 17:
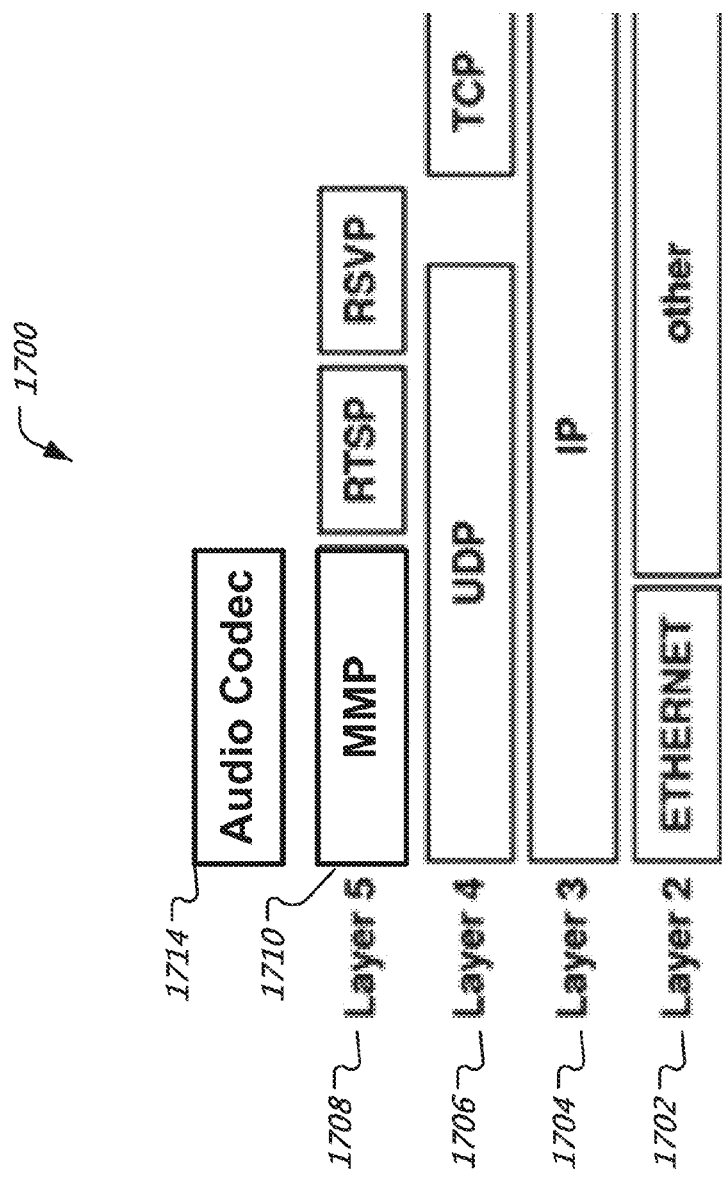
FIG. 17 shows an example of a receiver-side protocol stack.

FIG. 17 depicts an example protocol stack embodiment 1700 in which control data is provided inside of RTP packets. Unlike the separate RTP and RTCP modules 1610, 1612, working with their own different data packets that could be distinguished based on their different UDP port IDs, in embodiment 1700, media data is generated (on the transmitting side) or processed (on the receiving side) using a single mixed media protocol (MMP) module 1710. In other words, unlike embodiment 1600, the UDP layer 4 (1606) may have to accept packets from (for transmission) or provide packets to (for reception) a single module—with these packets not distinguishable at the UDP layer (layer 4) by simple inspection of the headers.

In one advantageous aspect, embodiment 1700 can completely do away with resources used in embodiment 1600 for book-keeping and other processing of a second UDP port ID that carries the RTCP data traffic. Because the total bandwidth used by a media session on the physical communication channel is a combination of the media traffic and the control traffic, the total bandwidth of the media session can be managed by simply processing a single UDP port ID (unlike some embodiments, where at least two different UDP port IDs may have to be used) for bitrate control.

Further, some embodiments may use multiple different audio codec modules 1714 (e.g., ISAC or Internet Speech Audio Codec, SPEEX, etc.). The embodiment 1700 advantageously simplifies embodiments by doing away with having multiple RTCP protocol stacks for fulfilling differing needs of different audio codecs.

In another advantageously aspect, the amount of bandwidth overhead consumed by control traffic can be reduced or eliminated. For example, IETF RFC 3550 recommends limiting RTCP traffic to 5% of session bandwidth. Much of the RTCP traffic, however, may be consumed by the header overhead, and thus the actual bandwidth used by control information may be a small fraction of the bandwidth allocated to RTCP. By contrast, by eliminating header overhead, duplicate fields (such as sequence numbers and time stamps) and control information that is not going to be used by the receiving node, embodiment 1700 can advantageously increase bandwidth efficiency by piggybacking or including control information into media packets.

In some embodiments, a packet transmission from the embodiment 1700 may be almost RTP-like, but may not comply with the RFC 3550 specification due to the inclusion of control information in RTP packets. Some embodiments may operate in a training mode in which their transmission mode, i.e., whether or not to use a mixed media packet, may be dependent on the format of received packets. For example, when an embodiment of the system 1700 receives RTP packets from a far end node with control information embedded in media packets, the embodiment 1700 may transmit media packets that carry control information, otherwise, the embodiment 1700 may transmit RTP and RTP packets using different UDP port IDs.

Figure 18:
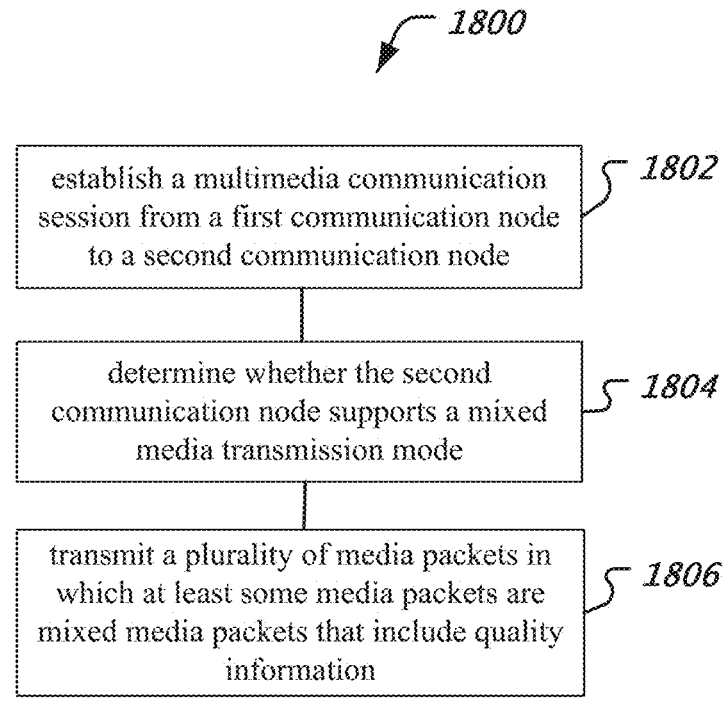
FIG. 18 shows an example flowchart of a data transmission method.

FIG. 18 is a flowchart of an example method 1800 of multimedia communication. The method 1800 may be implemented on a user device (e.g., a mobile device, a tablet, a personal computer, a wearable device, etc.).

At 1802, the method 1800 includes establishing a multimedia communication session from a first communication node to a second communication node. In various embodiments, the communication nodes may include a user device, or an application installed on the user device, e.g., a mobile app, The multimedia communication session may be conducted via a communication network using a communication protocol such as the previously discussed RTP protocol, or a variation thereof. For example, in some embodiments, each of the plurality of media packets follows a packet format that includes a packet header portion and a packet payload portion, wherein the quality information is included only in the packet header portion and the digitized media data is included only in the packet payload portion.

At 1804, the method 1800 may determine, e.g., based on a revision number of the second communication node, whether the second communication node supports a mixed media transmission mode in which media packets include control information.

At 1806, the method 1800 includes transmitting, when the second communication node supports the mixed media transmission mode, a plurality of media packets comprising media data from the first communication node to the second communication node at a given rate of packet transmission.

In method 1800, some of the plurality of media packets are mixed media packets which include digitized media data that is captured at a user interface of the first communication node and that further include quality information indicative of a quality of data packets received during the audio communication session from the second communication node within a time window of an observation duration.

In some embodiments, the system implementing method 1800 refrains from transmitting quality information from the first communication node to the second communication node in data packets that do not contain audio information. In other words, no separate control packets may be transmitted. In some embodiments, each media packet is a mixed media packet, i.e., carries control information.

In some embodiments, the number of media packets that contain quality information, or the percentage of total media packets, may be a function of the quality information. In some embodiments, the percentage may increase with decreasing data packet quality received from the second communication node. Alternatively, in some embodiments, the value of the fraction may decrease with decreasing quality of data packets received from the second communication node.

In some embodiments, the quality information includes at least one of a packet jitter value and a dropped packet count.

Figure 19:
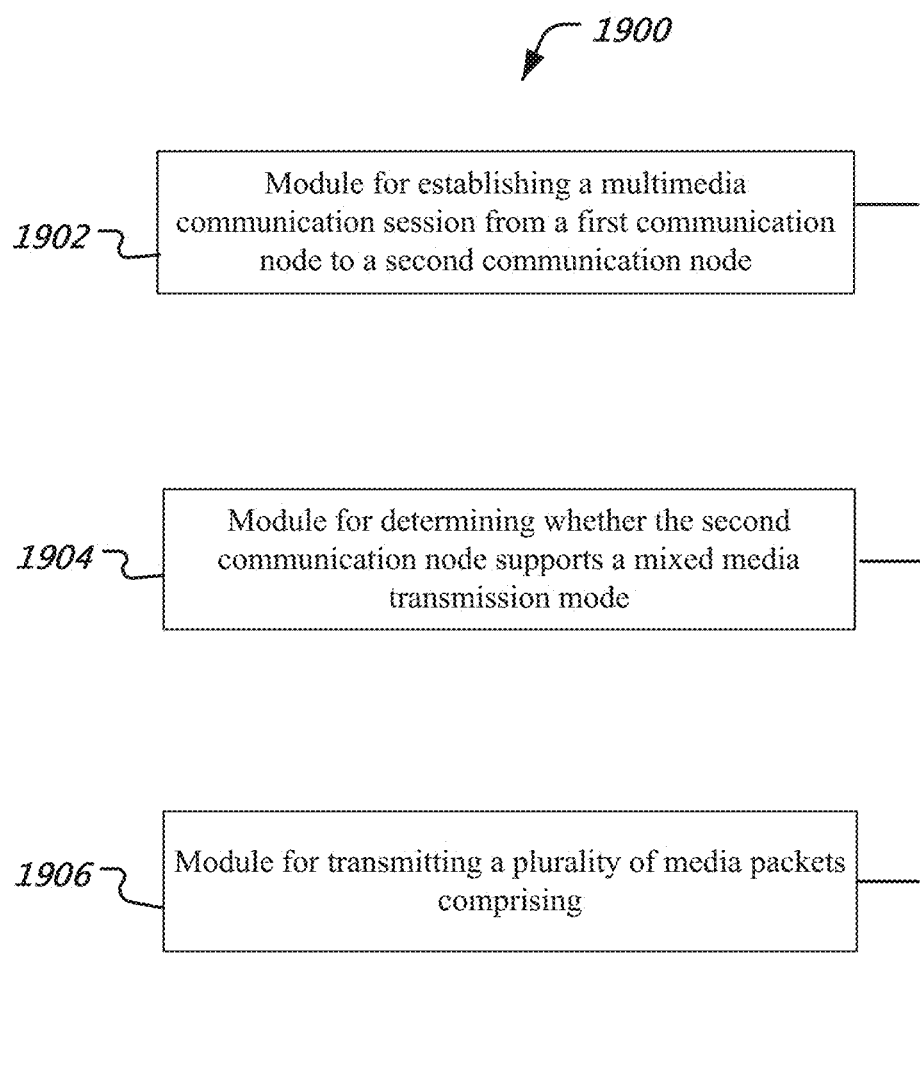
FIG. 19 shows an example of a packet transmission apparatus.

FIG. 19 is a block diagram of an example of a communication apparatus 1900. The module 1902 is for establishing a multimedia communication session from a first communication node to a second communication node, wherein the multimedia communication session is conducted via a communication network using a communication protocol. The module 1904 may be used for determining, e.g., based on a revision number of the second communication node, whether the second communication node supports a mixed media transmission mode in which media packets include control information. The module 1906 is for transmitting, when the second communication node supports the mixed media transmission mode, a plurality of media packets comprising media data from the first communication node to the second communication node at a given rate of packet transmission. In some embodiments, at least some of the plurality of media packets are mixed media packets which include digitized media data that is captured at a user interface of the first communication node and further include quality information indicative of a quality of data packets received during the audio communication session from the second communication node within a time window of an observation duration.

In some embodiments, an apparatus for receiving media data may include a memory and a processor. The processor may read instructions from the memory and implement a method that includes establishing an audio communication session with a sender node, wherein the audio communication session is conducted via a communication network using an internet protocol (IP) protocol and receiving a plurality of media packets comprising media data from the first communication node to the second communication node at a given rate of packet transmission. At least some of the plurality of media packets are mixed media packets which include digitized media data that is captured at a user interface of the first communication node and further include quality information indicative of a quality of data packets received during the audio communication session from the second communication node within a time window of an observation duration.

Parameter Configuration

Various of the disclosed embodiments improve encoding during a network call, such as a Voice Over Internet Protocol (VOIP) connection, by correlating various contextual parameters from previous calls, with appropriate settings for a current call. For example, the system may take note of the model of cell phone used during a communication, the carrier, the presence of a WiFi connection, the user rating, the codecs employed, etc. During a subsequent call, the system may compare these past calling parameters with the current situation, and may select call settings (e.g., codec selections) based thereon. Machine learning methods may be applied using the past data to inform the selection of the settings for the present call. Machine learning methods, such as Support Vector Machines (SVMs), neural networks, Bayesian updates, etc. may be used.

Various embodiments provide methods that use measurements of the level of echo or background noise to algorithmically optimize the Automated Echo Cancellation (AEC) or Noise Suppression (NS) behavior of a computer system. Echo suppression and noise suppression algorithms have varying degrees of effectiveness based on the type of noise and intensity. Some devices have hardware based echo/noise suppression, which may or may not be better than some software implementations. Still other devices may report that they have echo/noise suppression capabilities, but fail to engage them due to software defects.

Many prior art tuning algorithms are unable to adequately support these situations. First, it may not be possible to know in advance all the types and intensities of noise to which a user may be subjected to. For example, a first user may live in a noisy urban environment and experience much higher levels of noise, and noise of a different character, from a second user in a rural environment. Similarly, a first user's device may have different levels of echo than a second user's device. Testing all the possible devices available to a user is an impracticable method for anticipating each device's particular noise-affecting characteristics. Second, software operating on the user devices improves and changes all the time. Optimizing noise based upon an initial configuration may not be durable.

Figure 20:
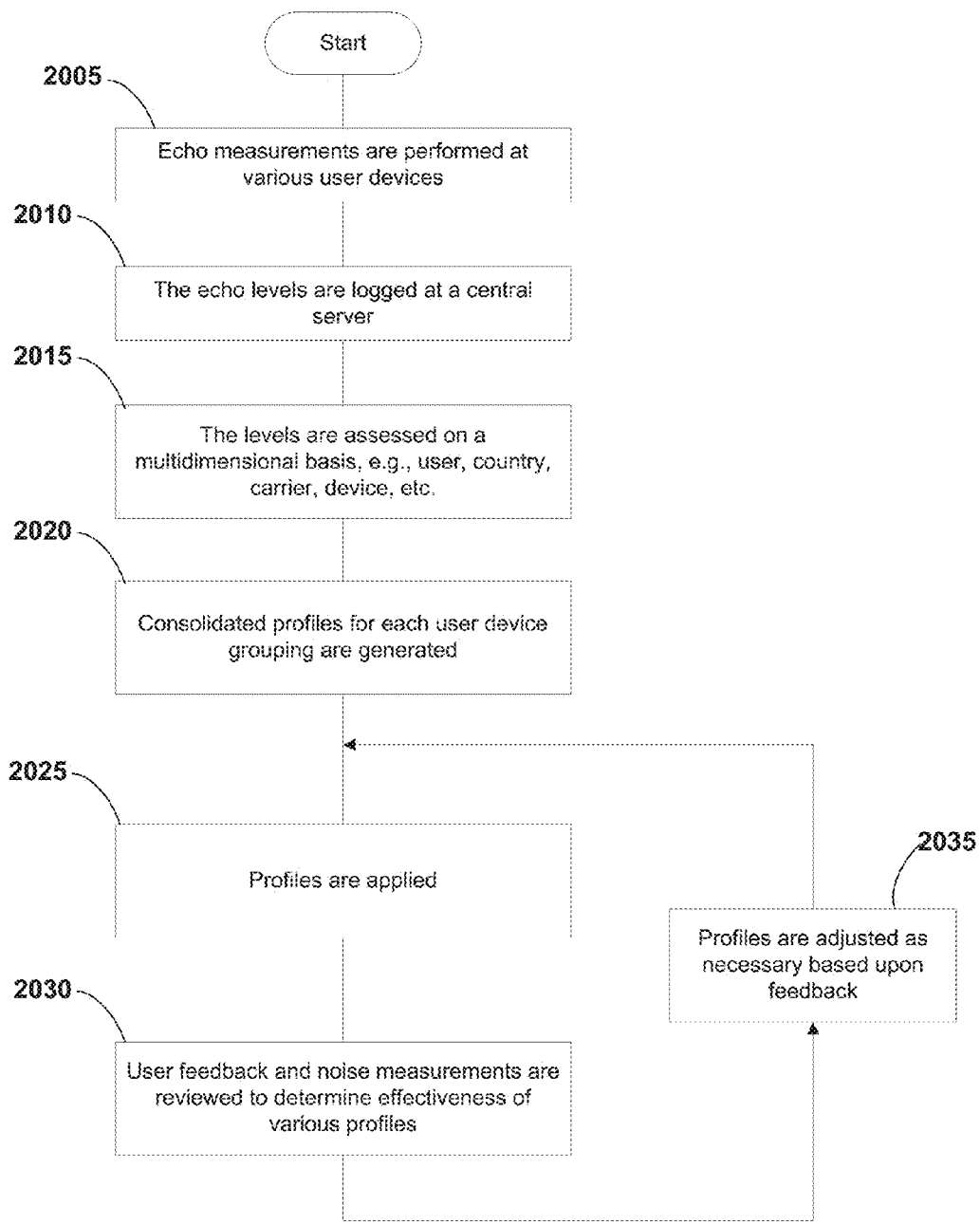
FIG. 20 is a flow diagram illustrating an example process for performing noise level adjustments across multiple devices as may be implemented in some embodiments.

FIG. 20 is a flow diagram illustrating an example process for performing noise level adjustments across multiple devices as may be implemented in some embodiments. Though noise levels are depicted in this example, one will recognize that other communication parameters may be monitored and adjusted in some embodiments.

Some embodiments measure the echo level and/or other artifacts, such as background noise, affecting comfort noise generation. At block 2005, an energy measurement may be made to determine echo for various permutations of hardware and software algorithm configurations. These changes may be distributed across a corpus of users to achieve statistically significant data. At block 2010, the echo level may be logged to a server (e.g., to a social networking server). At block 2015, the server may then apply machine learning, or human analysis may be used, to assess the noise level at a user, country, carrier, device, and operating system basis.

At block 2020, consolidated profiles for each of the different user device types may be generated. At block 2025, these profiles may be applied during subsequent communications. The system may configure relevant devices appropriately by setting the mode on the server (e.g., the client may pull the mode down from the server on a recurring basis, either automatically or in accordance with user input). For example, if a given device shows lower measured echo levels on average in software echo cancellation mode rather than hardware echo cancellation mode, the system may subsequently configure the device model, through a server side control, to always run in software mode.

At block 2030, human reviewers and/or the server system may analyze data from the calls, comparing both measured noise and subjective user ratings (e.g., star ratings from a marketplace) to verify that the change effected by each profile was a desirable one. The profiles may be updated at block 2035, based upon this feedback until a preferred behavior is consistently produced (e.g. for at least some threshold percentage of cases).

Various embodiments increase the user satisfaction of voice and video calls. These embodiments may save substantial money by avoiding the manual testing of all possible devices. This may allow for more specific configuration of devices based on environment.

Figure 21:
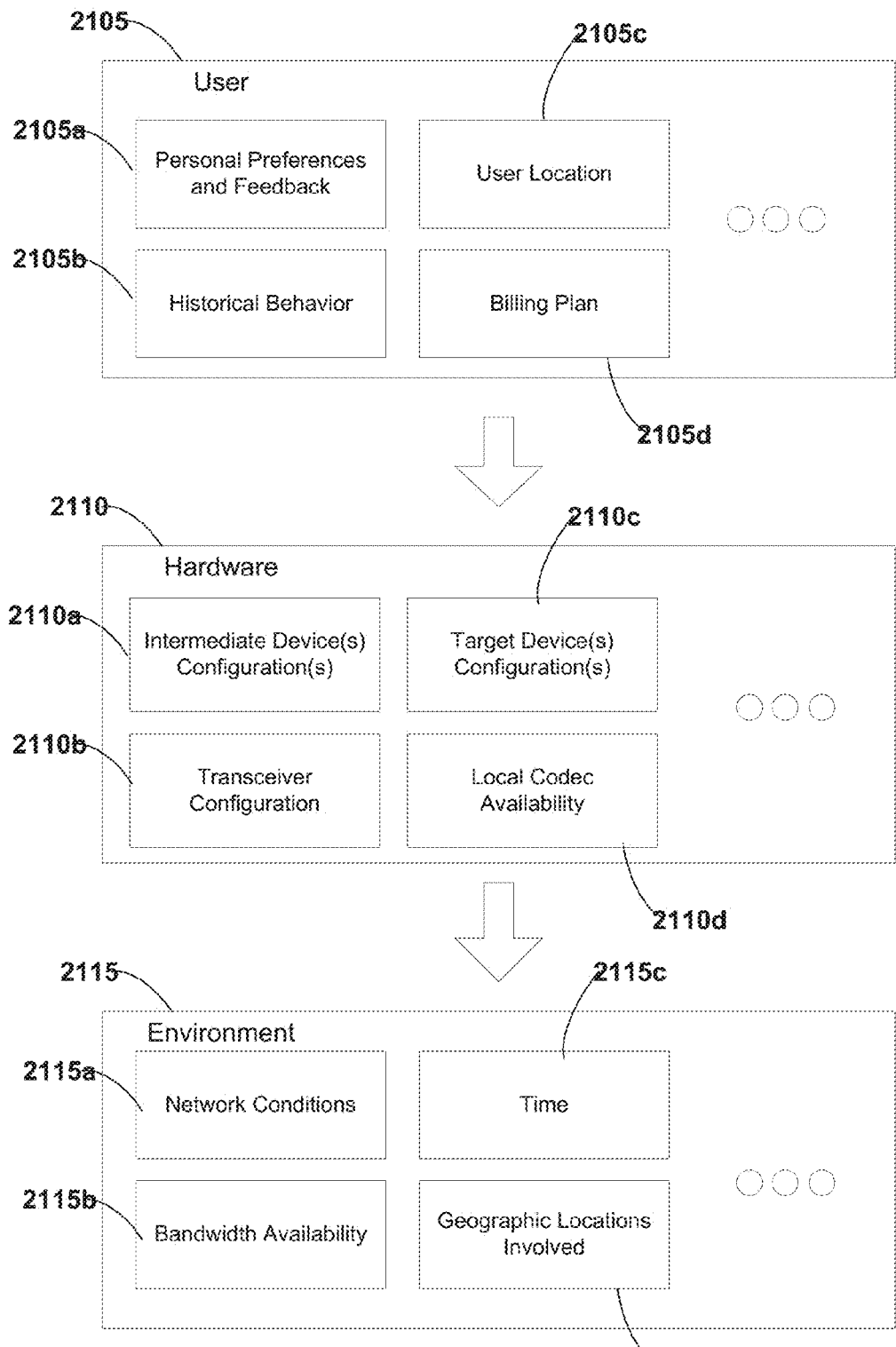
FIG. 21 is a block diagram illustrating an example topology between various feature sets impacting a parameter configuration determination as may occur in some embodiments.

FIG. 21 is a block diagram illustrating an example topology between various feature sets impacting a parameter configuration determination as may occur in some embodiments. The various dimensions may be considered, e.g., when assessing feedback at blocks 2015 and 2035. The dimensions may be arranged in a total or partial ordering and may include various features associated with the users of the device (e.g., where the environment 2115 or user level dimension 2105). For example, the user's personal preferences and call feedback ratings 2105a, the user's location 2105c, the user's historical usage patterns 2105b, the user's billing plan 2105d, etc. may be considered. Similarly, at the hardware level dimension 2110, features regarding the intermediate device configurations 2110a, the target device configurations 2110c, the user device transceiver configuration 2110b, the availability of codecs on the user device 2110d, etc. At the environment level dimension 2115, features concerning the network conditions at the hardware level dimension 2115a, the time at which the call is performed 2115c, the available bandwidth 2115b, the geographic locations of the users 2115d, etc.

Additional examples of user level features considered may include: the speakerphone/earpiece/headset mode; an indication whether the user mutes/un-mutes the device; a speaker path volume setting; an indication whether the hardware AEC is configured to be enabled; an indication whether the hardware NS is configured to be enabled; an indication of the audio mode of the platform: the device state, e.g., Normal, In_Call or In_Communication; an indication whether the WebRTC AECM module is configured to be enabled; an indication whether the WebRTC NS module is configured to be enabled; an indication whether the WebRTC AGC module is configured to be enabled; the mode of the WebRTC AECM configured on the system (e.g., HeadSet, Earpiece, Loud Earpiece, Speakerphone, Loud Speakerphone); the mode of the WebRTC NS configured on the system (e.g., Low Suppression, Moderate Suppression, High Suppression, Very High Suppression); the mode of the WebRTC AGC configured on the system (e.g., Adaptive Analog, Adaptive Digital, Fixed Digital); etc.

Additional examples of hardware level features may include: the AGC configuration; a decision to enable/disable the VAD at the encoder; the mode of VAD at the encoder; the nominal CPU of the system; system load in percentage; a total system memory; the type of CPU in the user device; the type of audio chip in the user device; etc.

Additional examples of environment level features may include: the sender code name; the codec indicated in the sender information; the sender codec property time series; the round trip delay, e.g. as indicated in the sender information; uplink bandwidth; sender audio level, e.g., as indicated in an information time series; the send-side duration of comfort noise; the send-side comfort noise; the bytes sent; the packets sent; the receive packets received; the receiver packet jitter statistics; the receiver expand rate statistics; the downlink bandwidth statistics in the receiver information; Dynamic Buffer Extension (DBE) time series; the time series of receiver audio level; time series of receiver jitter; the time series of receiver expand rate; the time series of the receiver lost packet; the duration of comfort noise; the total packet count of comfort noise; the total frame count of Packet Loss Concealment (PLC) generation; the receiver round trip delay; network statistics; the overall delay of the conversation; status of first received packets; status of first transmitted packets; etc.

Additional factors may include: an indication whether the receiving side has significant signal (before WebRTC); an indication whether the hardware AEC is present; an indication whether the software AEC is present; an indication whether the percentage of frames at the receive output is silent (e.g., very small energy <−70 dbm); an indication whether the percentage of frames at the receive output is silent (e.g., very small energy <−70 dbm); an indication whether the percentage of frames at the send input is silent (e.g., very small energy <−70 dbm0); an indication whether the percentage of frames at the send output is silent (e.g., very small energy <−70 dbm0); an indication whether the percentage of frames at the receive input is quiet (e.g., small energy <−45 dbm0); an indication whether the percentage of frames at the receive output is quiet (e.g., small energy <−45 dbm0); an indication whether the percentage of frames at the send input is quiet (e.g., small energy <−45 dbm0); an indication that the percentage of frames at the receive in is potentially saturated; an indication whether the percentage of frames at the receive output is potentially saturated; an indication whether the percentage of frames at the send input is potentially saturated; an indication whether the percentage of frames at the send output is potentially saturated; an indication of the noise level at the receive input; an indication whether the noise level at the receive output; an indication of the noise level at the send input; an indication of the noise level at the receive input; the audio level histogram at the mic raw input; the audio level histogram at mic input after WebRTC media processing; the audio level histogram at codec output; the audio level histogram at speaker codec interface; an indication whether the distortion of the voice at the receive input; an indication of the distortion of the voice at receive output; an indication whether the distortion of the voice at the send input; an indication of the distortion of the voice at the send output; the mode of WebRTC mute; a frame count of not playing (indicating that the WebRTC state is inconsistent), a frame count when the WebRTC media engine cannot feed data to speaker in time, a frame count of getting mic input, total in device info; a frame count of sending speaker audio; a frame count of silent frames in the mic; a frame count of absolute zero frames in mic path, zero in device info; a frame count of record buffer not keeping up with mic input; etc.

Figure 22:
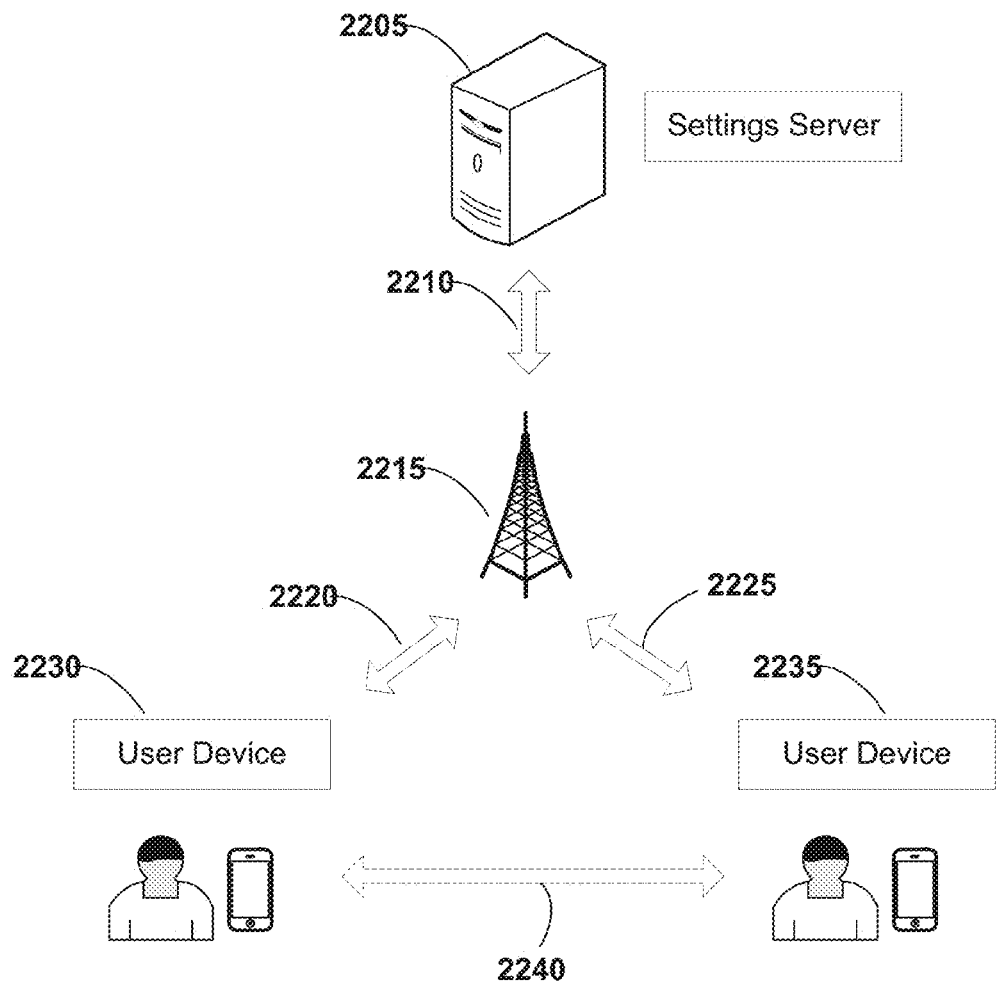
FIG. 22 is a block diagram illustrating an example topology for assessing, optimizing, and performing a communication as may occur in some embodiments.

The system may report when the user makes a call, mutes/un-mutes the speaker on the user device, and the time of change and the mute status (1 for mute and 0 for un-mute). Changes to the volume on the device may also be reported. There are many reasons the volume value may change. The value may change if the configuration of hardware AEC is changed. The value may change if the configuration of hardware NS is changed. The value may change if the configuration of hardware is changed. The value may change if the configuration of WebRTC AECM is changed. The value may change if the configuration of WebRTC NS is changed. The value may change if the configuration of WebRTC AGC is changed. The value may change if the configuration of WebRTC AECM mode is changed FIG. 22 is a block diagram illustrating an example topology for assessing, optimizing, and performing a communication as may occur in some embodiments. Users may communicate via user devices 2230, 2235, which may serve as sources and receivers in duplex or half-duplex configurations. The user devices 2230, 2235 may communicate directly across a direct connection 2240, or across network connections 2220, 2225, e.g., via a cellular tower 2215, Internet hub (not shown), etc. The user devices 2230, 2235 may periodically report data from past calls to a settings server (e.g., a social network server) 2205 via a network connection 2210.

Figure 23:
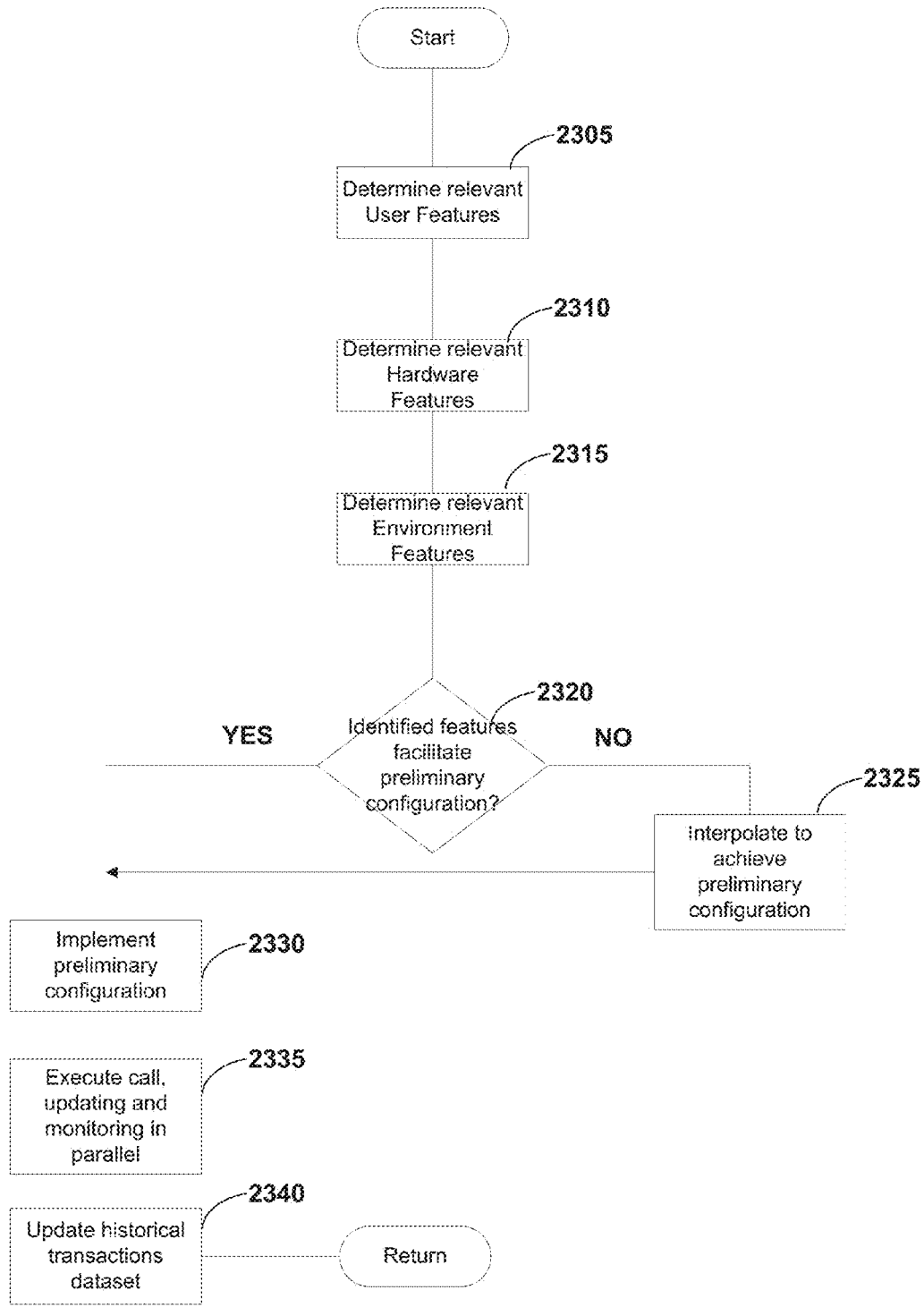
FIG. 23 is a flow diagram illustrating an example process for generating a preliminary configuration based upon a feature topology as may occur in some embodiments.

FIG. 23 is a flow diagram illustrating an example process for generating a preliminary configuration based upon a feature topology as may occur in some embodiments. At block 2305, the system may determine relevant user-level features across many users in a variety of settings. At block 2310 the system may determine relevant hardware level features. At block 2315, the system may determine relevant environment features. If the identified features do not facilitate the determination of a preliminary configuration at block 2320, the system may interpolate the feature values at block 2325 to achieve a preliminary configuration. At block 2330, the system may implement the preliminary configuration as the profile for a user device in the group of user devices. When the user device executes a call at block 2335 it may report updates regarding the suitability of the configuration to the settings server 2205. When the call completes, the system may update the historical transactions dataset at block 2340 to facilitate the subsequent review of the profile's effectiveness for this user device.

Figure 24:
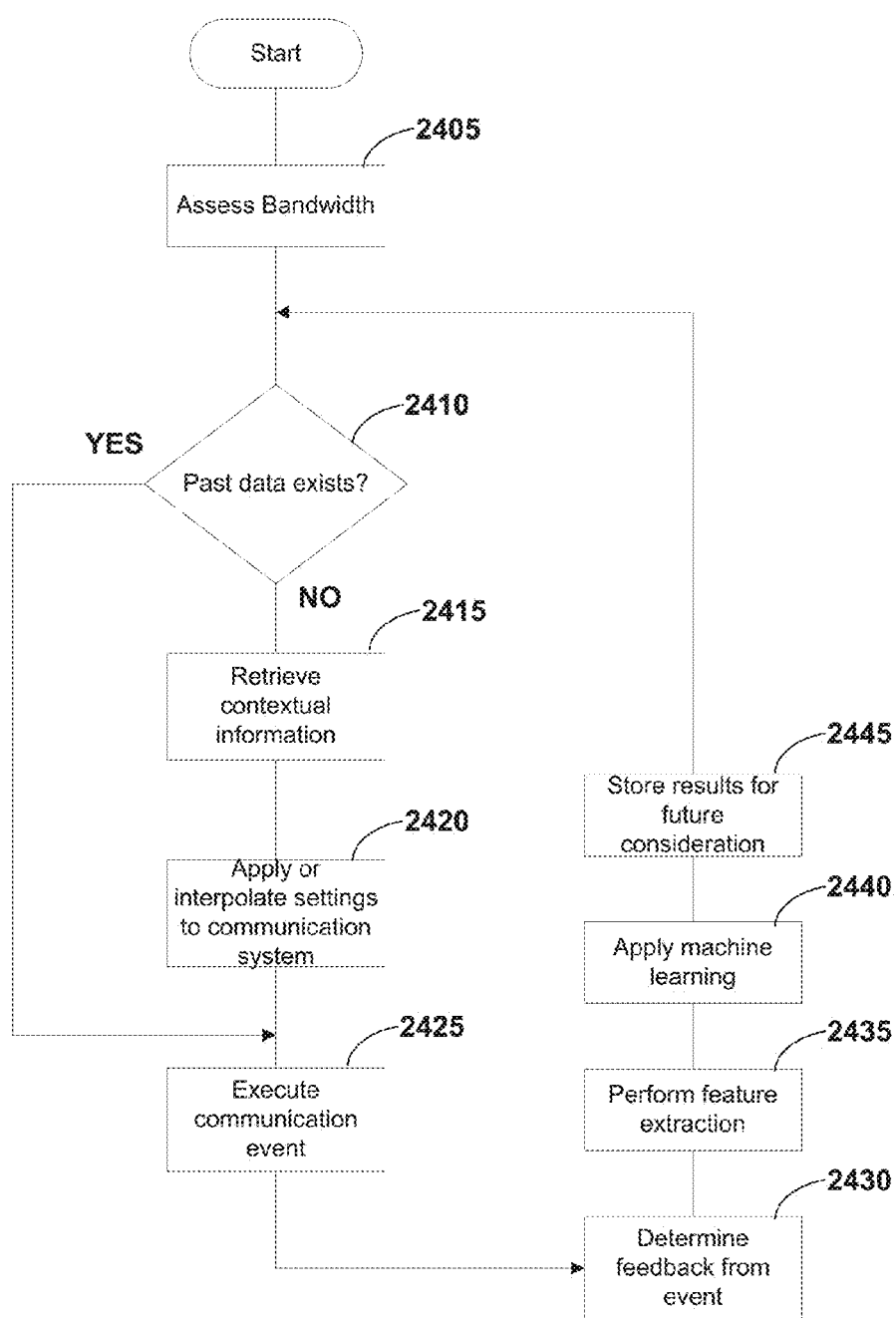
FIG. 24 is a flow diagram illustrating an example process for training a preference machine learning system as may occur in some embodiments.

FIG. 24 is a flow diagram illustrating an example process for training a preference machine learning system as may occur in some embodiments. At block 2405, the system may assess the bandwidth available to the user device. At block 2410, the system may determine if past data exists from which to select or generate a profile. If such data does not exist, at block 2415 the system may retrieve contextual information regarding this particular call. At block 2420, the system may then interpolate the settings from a similar device and context to this call to the server as a temporary configuration profile.

At block 2425, the system may execute the communication event, e.g., the user devices may initiate the conversation. At block 2430, during and/or following the call, the system may determine feedback from the event. Using the feedback, at block 2435, the system may perform feature identification and extraction. At block 2440, the system may apply machine learning to identify causal correlations between various user, hardware, and environment level features and the quality of the call.

At block 2445, the system may store the results for future consideration during profile assessment.

Codec Switching

In various embodiments, a corpus of codecs may be correlated with different, partially overlapping ranges of transmission characteristics. As channel conditions degrade or improve, the system may select a new codec with which to continue the connection based upon the corresponding overlapping range. Codecs may not be switched immediately when the transmission characteristics enter overlapping ranges, to avoid degrading the user's experience. If the characteristics remain in the overlap, or manifest a likely progression toward another region, then the transition may be effected.

In the last few years, the Internet Protocol (IP) has emerged as a packet format in which data, audio and video traffic is carried around wired or wireless communication networks. When data packets traverse a shared and/or an opportunistic bandwidth network such as the public internet, individual data packets may experience different network characteristics such as delay, bandwidth or packet errors.

In real time voice and video communication, Forward Error Correction (FEC) is often used to achieve success in delivering error-free messages in spite of degraded channel conditions. Using FEC, a transmitter sends two streams of media simultaneously: one high bandwidth, one low bandwidth. The media, e.g., an audio conversation, is played from the high quality, high bandwidth stream, but when a high quality packet is lost, which can happen regardless of available bandwidth, it is replaced by the similar packet from the low quality stream. In traditional implementations, the low-quality signal is typically a lower resolution version output the same codec as the high quality signal. This has limitations, because codecs typically can't ramp their bandwidth dramatically, so the low quality signal may substantial overhead, which limits the application of FEC.

In one illustrative example, if the user has 40 kbps of available bandwidth, the high quality signal is 30 kbps, and the low quality signal is 15 kbps, the user needs 45 kbps to make an FEC based transmission scheme to work. Because the available bandwidth (40 kbps) is less than the required bandwidth (45 kbps), FEC won't work. Using the techniques disclosed in the present document, among other things, a transmitted can replace the low bandwidth media stream with a different codec. In one possible permutation, ISAC (Internet Speech Audio Codec) could be used as the high quality codec (around 30 Kbps) and SPEEX as the low quality codec (around 5 Kbps). This enables the low quality signal to be even lower bandwidth, say, 5 kbps, so that 30+5=35 kbps and FEC can be enabled. This will provide a better user experience because to support a higher quality codec but not good enough to support traditional FEC Embodiments provide improved encoding during a network call, such as a Voice Over Internet Protocol (VOIP) call. Particularly, a corpus of codecs may be correlated with different, partially overlapping ranges of transmission characteristics. As channel conditions degrade or improve, the system may select a new codec with which to continue the connection based upon the corresponding overlapping range. Codecs may not be switched immediately when the transmission characteristics enter overlapping ranges, to avoid degrading the user's experience. If the characteristics remain in the overlap, or manifest a likely progression toward another region, then the transition may be effected.

Figure 25:
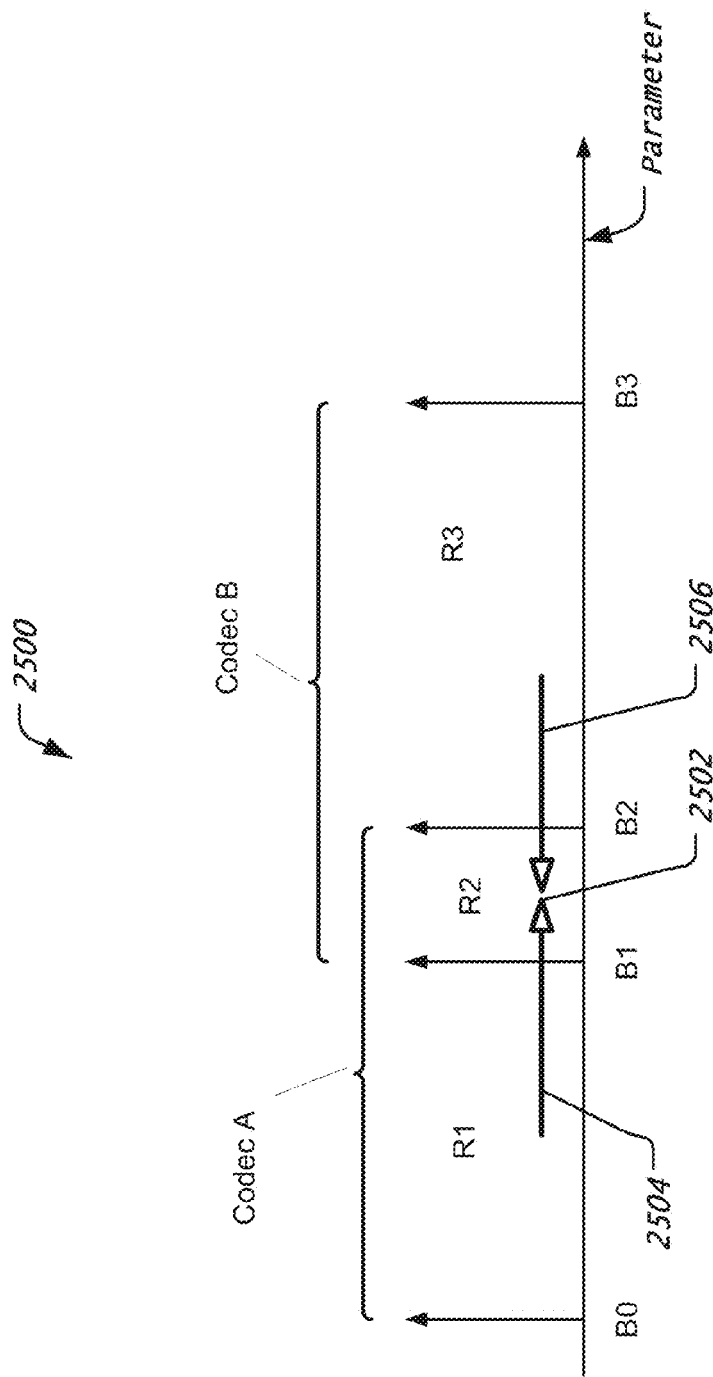
FIG. 25 shows an example of codec switching performed by a communication device.

FIG. 25 illustrates an example 2500 of how operational parameters can be used for codec selection. For a given media type (audio or video), Codec A may be preferred choice of encoding when the operational condition is such that a bitrate between B0 and B2 can be allocated to the codec. In an overlapping range B1 to B3 (where B1 is less than B2, but B3 is greater than B2), codec B may be a preferred codec for encoding media content. Thus, when the operational condition is in the range R1 (between B0 and B1), then codec A may be selected. Similarly, when the operating range is R3 (between bitrates B2 and B3), Codec B may be selected. In the range R2, it may be possible to select either codec A or codec B, e.g., because both codecs give similar performance. In such as case, in some embodiments, preference may be given to keep using the codec currently in use. For example, Codec A may be used in the range R2, is codec A was being used based on a previous operational condition. Alternatively or additionally, in some embodiments, a hysteresis time period may be used before a change of codec is made. For example, no codec change is made in the region R2, if the last change was within a pre-determined time period (e.g., 10 seconds); otherwise, a codec change is made to keep up with changes in the network conditions.

Operational point 2502 may represent a state of a multimedia communication session in which a certain network condition is present. For example, the available network bandwidth may be between 32 Kbps and 40 Kbps, with a packet error rate of less than 5% and end to end latency less than 20 milliseconds. The transmitting device may be able to use multiple audio or video codecs to encode user data and provide a satisfactory experience to the user. For example, two codecs, Codec A and Codec B may be usable at the operational point 2502. Of the possible codecs, which codec is being used at a given time may depend on network conditions in a preceding time period. For example, when the current operational point 2502 is reached due to a change in encoding parameters, indicated by transition 2504, where Codec A was being used earlier, the transmitting node may keep using Codec A to minimize any glitches or discontinuities on the receiver-side. Similarly, if Codec B was being used previously, then as indicated by transition 2506, the transmitting node may keep using Codec B as the operational point 2502. It can be seen that, in some embodiments, different codecs may be used during a multimedia session at the same operating points, such as available bitrate, depending on the historical codec use.

Figure 26:
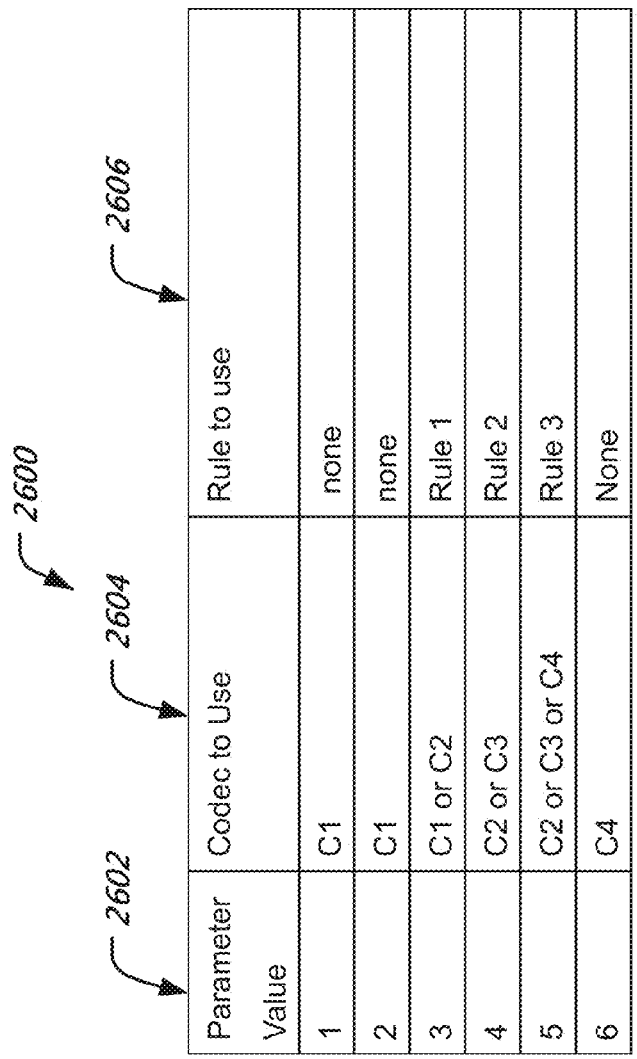
FIG. 26 shows an example of a lookup table stored in a communication device.

FIG. 26 depicts an example look-up table 2600 that may be stored in a memory at the transmitter side (e.g., user 105a). In some embodiments, when the receiver is tracking and anticipating codec changes from the transmitter, a similar table 2600 may also be stored at the receiver side (e.g., user 105b,c). Column 2602 lists various values or ranges of a given operational parameter (e.g., bitrate or packet loss percent, or end-to-end delay, etc.). Column 2604 lists a corresponding codec that could be used when the operational parameter is as listed in a given row. Column 2606 lists a corresponding rule that may be used to resolve which particular codec to use when multiple codecs can be used at a given parameter value. For example, Rule 1 may specify codec use based on prior history. For example, Rule 1 may specify that C1 should be used if C1 was being used for the last 5 seconds, otherwise C2 is to be used. Another example rule may be based on cross-parameter selection. For example, in some embodiments, a different table 2600 may be maintained for multiple parameters such as packet loss and bandwidth. A cross-parameter rule, e.g., Rule 3, may specify that C2 is to be used if another parameter (not depicted in FIG. 26) is within a certain value range, or C3 if that parameter is within another value range, or C4 for all other cases.

Figure 27:
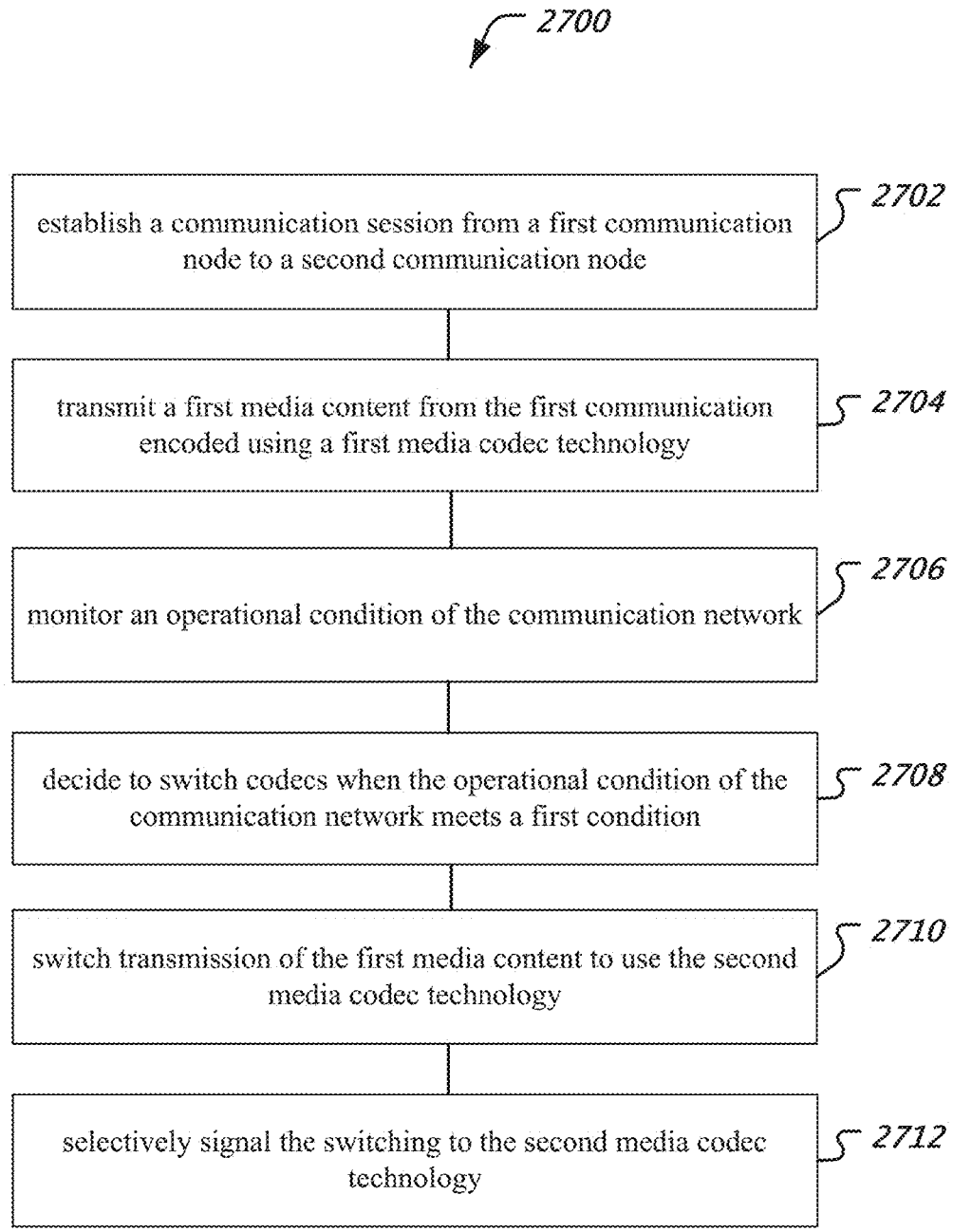
FIG. 27 shows an example flowchart for a method of transmitting media packets.

FIG. 27 shows an example flowchart for a method of transmitting media packets. FIG. 27 shows an example flowchart of a method 2700 of media communication. The method 2700 may be implemented by a source node, or a transmitting node, of media data in a media communication session.

At 2702, the method 2700 includes, establishing a communication session from a first communication node to a second communication node, wherein the first communication node and the second communication node are communicatively connected to each other over a communication network. The first communication node and the second communication node may user devices (e.g., those associated with users user 105a-c as depicted in FIG. 1).

At 2704, the method 2700 includes, transmitting a first media content from the first communication node to the second communication node, wherein the first media content is encoded using a first media codec technology.

At 2706, the method 2700 includes, monitoring, during the communication session, an operational condition of the communication network. In various embodiments, the monitoring the operational condition of the communication network includes monitoring one or more of an end-to-end trip delay between the first communication node and the second communication node, network bandwidth availability, network delay condition and network packet error rate condition At 2708, the method 2700 includes, deciding to switch, when the operational condition of the communication network meets a first condition, the first media codec technology to a second media codec technology. In some embodiments the decision to switch may include maintaining a history of codec switching times, and ensuring that no to consecutive codec switching occurs closer than a minimum switching time apart from each other.

At 2710, the method 2700 includes, switching, after deciding to switch, transmission of the first media content of the communication session to use the second media codec technology. In some embodiments, the switching may be a soft switching. For example, for a transition duration, concurrent transmission of the first media content using both the first media codec technology and the second media codec technology. The transition duration may be dependent on the device receiving the media packets. For example, a software-implemented device may not need a transition period, while a hardware-implemented device may want to receive an early notification, so that hardware can be reconfigured.

At 2712, the method 2700 includes, selectively signaling, via the communication network, the switching to the second media codec technology. In some embodiments selective signaling may be performed by determining a type of the second communication node, and conveying, based on the type of the second communication node, the switching to the second communication node. Some receiving nodes, or second communication nodes, may be of a type that expects to be notified of a codec change while other nodes may not expect an advanced notice of an upcoming change in the codec. In some embodiments, when it is determined that the type of second communication node can seamlessly operate through codec switching, and then refraining from signaling the switching.

In some embodiments the selective signaling may include sending a control message using a data packet that includes the first media content in the data packet. In some embodiments, the method may also include storing, in a memory, a list of a plurality of network operational conditions and corresponding codecs to be used, and determining the second media codec technology based on a nearest match in the list to a current operational condition of the communication network. In some embodiments, the communication session also has a second media content associated with the session and wherein the second media content is of a type different from the first media content and the method further includes switching, based on the operational condition of the communication network, a codec technology used for the second media content. For example, in some embodiments, the described codec switching may be performed independently and concurrently for audio and video portions of a media session. In some embodiments, the method 2700 includes deciding a sequence of switching codecs for the first media content and the second media content based on a switching rule (e.g., as shown in FIG. 26).

Figure 28:
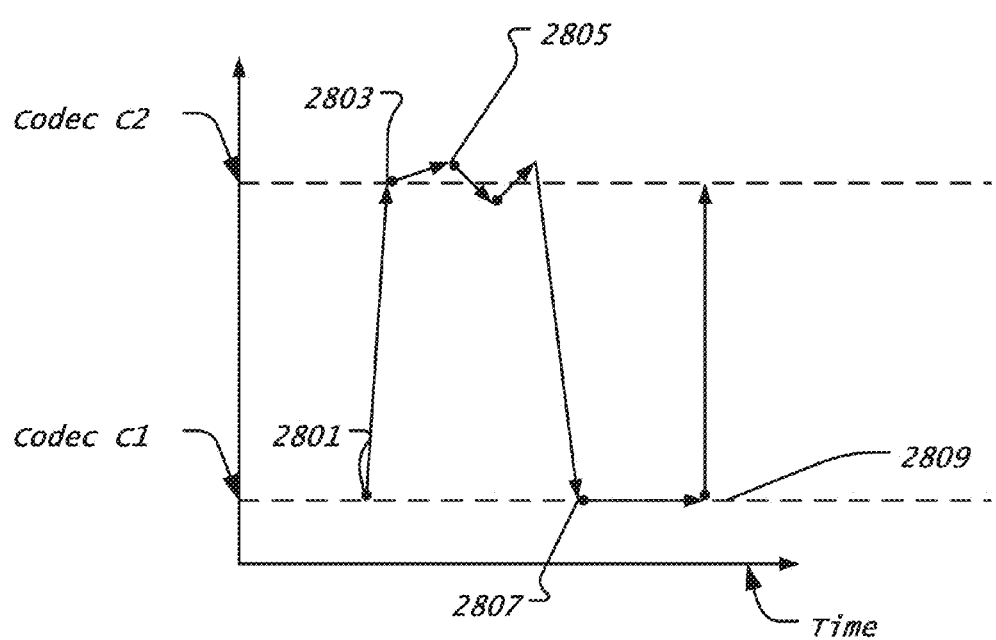
FIG. 28 shows an example of a two-codec switching performed by a media communication device.

FIG. 28 depicts an example of a media transmission system using two codecs, Codec C1 and C2. Along the horizontal time axis, from left to right, the transmitting node may be transmitting media at an operational point 2801 where it may be encoding media data using Codec C1. Due to a change in the network condition, the communication device may switch to using Codec C2 at operational point 2803. As the network conditions keep changing, for a pre-determined time period, the transmitting node may adapt to the changing conditions by simply adjusting encoding parameters of Codec C2 (as indicated by operational point changes 2805). Beyond the time period, a change in the network condition may cause the transmitting node to switch from Codec C2 to Codec C1 (2807). A next change in the network condition may occur after the pre-determined time period has expired, thereby causing a change in codec used (2809) without any intermediate changes to the encoding parameters of codec C1.

Figure 29:
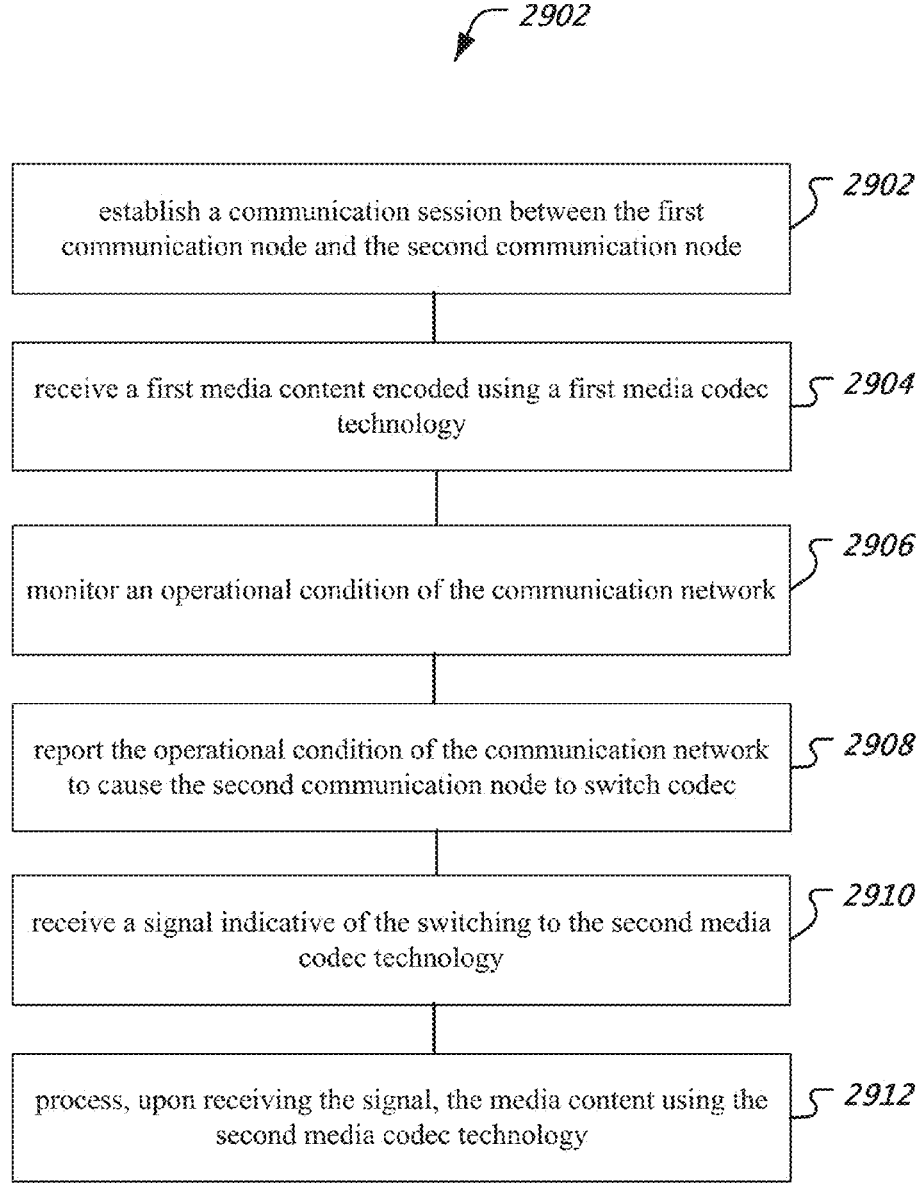
FIG. 29 shows an example flowchart of a method of receiving media packets in which the encoding codec is switched over a period of time.

FIG. 29 shows an example flowchart of a method of receiving media packets in which the encoding codec is switched over a period of time. FIG. 29 shows an example flowchart for a method 2900 implemented on the receiver-side of a media session.

At 2902, the method 2900 includes establishing a communication session between the first communication node and the second communication node, wherein the first communication node and the second communication node are communicatively coupled to each other over the communication network. The receiver may store a plurality of media codec technology modules. For example, the media codec modules may be stored as software executable modules that can be loaded into a processor memory such that, when needed, a module corresponding to a codec, can be used to decode received media data.

At 2904, the method 2900 includes receiving a first media content at the first communication node from the second communication node, wherein the first media content is encoded using a first media codec technology.

At 2906, the method 2900 includes monitoring, during the communication session, an operational condition of the communication network. Various network operational conditions are disclosed in the present document.

At 2908, the method 2900 includes reporting, from the first communication node, the operational condition of the communication network to cause the second communication node to switch the first media codec technology to a second media codec technology.

At 2910, the method 2900 includes receiving, from the second communication node, a signal indicative of the switching to the second media codec technology. The signal may be an implicit signal, e.g., certain header information of media data packets may change, or an explicit signal, e.g., a control message that provides information about when and which codec is being switched to.

At 2912, the method 2900 includes processing, upon receiving the signal; the media content of the communication session by using the second media codec technology.

Computer System

Figure 30:
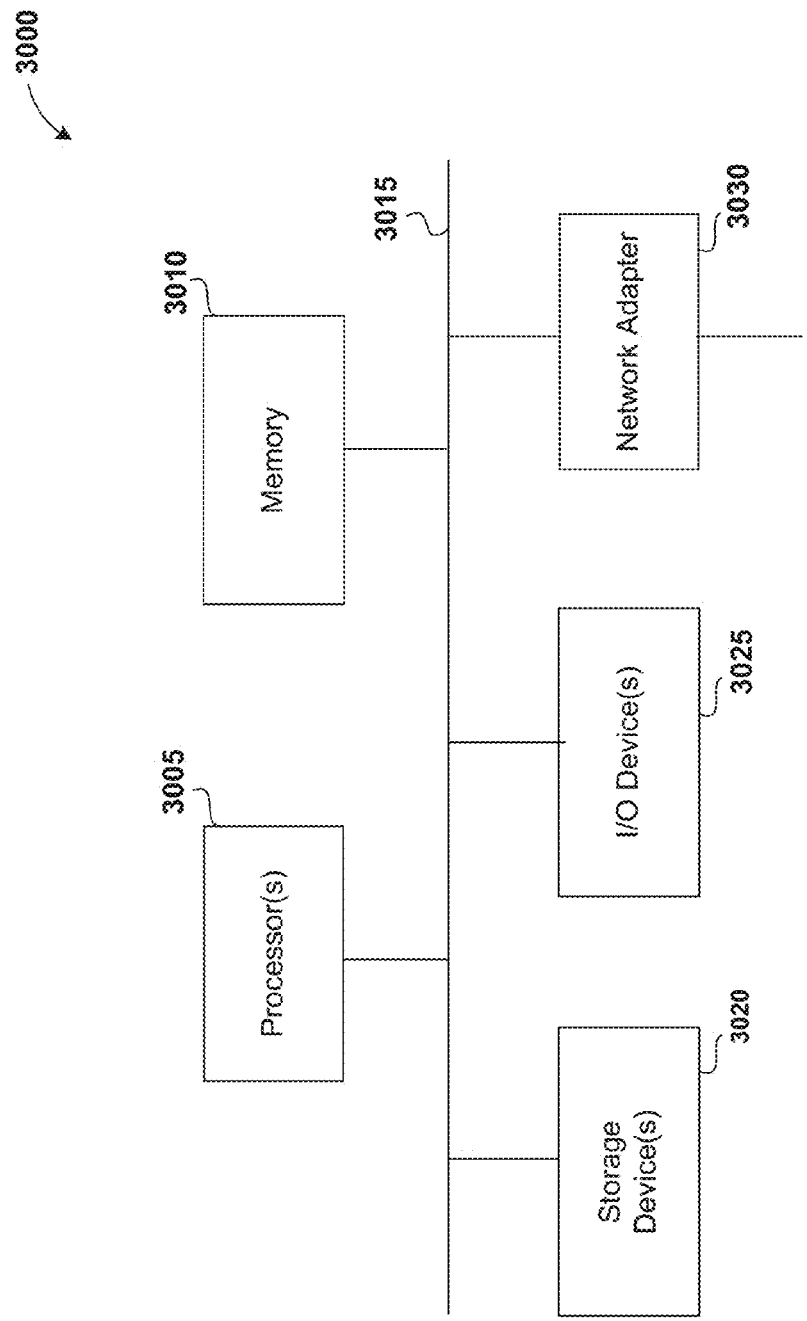
FIG. 30 is a block diagram of a computer system as may be used to implement features of some of the embodiments.

FIG. 30 is a block diagram of a computer system as may be used to implement features of some of the embodiments. The computing system 3000 may include one or more central processing units ("processors") 3005, memory 3010, input/output devices 3025 (e.g., keyboard and pointing devices, display devices), storage devices 3020 (e.g., disk drives), and network adapters 3030 (e.g., network interfaces) that are connected to an interconnect 3015. The interconnect 3015 is illustrated as an abstraction that represents any one or more separate physical buses, point to point connections, or both connected by appropriate bridges, adapters, or controllers. The interconnect 3015, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 3010 and storage devices 3020 are computer-readable storage media that may store instructions that implement at least portions of the various embodiments. In addition, the data structures and message structures may be stored or transmitted via a data transmission medium, e.g., a signal on a communications link. Various communications links may be used, e.g., the Internet, a local area network, a wide area network, or a point-to-point dial-up connection. Thus, computer readable media can include computer-readable storage media (e.g., "non transitory" media) and computer-readable transmission media.

The instructions stored in memory 3010 can be implemented as software and/or firmware to program the processor(s) 3005 to carry out actions described above. In some embodiments, such software or firmware may be initially provided to the processing system 3000 by downloading it from a remote system through the computing system 3000 (e.g., via network adapter 3030).

The various embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

What is claimed is:

1. A computer-implemented method, comprising:
receiving a first plurality of encoded audio data segments in a first encoding format, the first encoding format associated with payloads of a first size;
receiving a second plurality of encoded audio data segments in a second encoding format, the second encoding format associated with payloads of a second size;
determining a least common multiple of the first size and the second size;
allocating a portion of a first data communications packet ("packet") to receive the first plurality of encoded audio data segments and the second plurality of encoded audio data segments based on the least common multiple;
inserting the first plurality of encoded audio data segments and the second plurality of encoded audio data segments into the portion of the first packet; and
transmitting the first packet.

2. The computer-implemented method of claim 1 wherein the first size is larger than the second size.

3. The computer-implemented method of claim 1, the method further comprising estimating an available bandwidth on the channel based on a latency associated with a second packet transmission, the second packet transmission preceding the first packet transmission, wherein transmitting the first packet comprises transmitting the first packet on the channel.

4. The computer-implemented method of claim 3, wherein allocating the portion of the first packet comprises allocating an integer number of the least common multiple of bytes, the integer selected based upon the estimation of the available bandwidth.

5. The computer-implemented method of claim 3, wherein estimating an available bandwidth comprises measuring a round-trip-time for the second packet.

6. The computer-implemented method of claim 1, the method further comprising encoding a size of a non-data portion into the first byte of padding in the first packet.

7. The computer-implemented method of claim 1, wherein the first packet comprises an FEC payload with BWE index, information bits, and RTT information.

8. A non-transitory computer-readable medium comprising instructions configured to cause at least one processor to perform a method comprising:
receiving a first plurality of encoded audio data segments in a first encoding format, the first encoding format associated with payloads of a first size;
receiving a second plurality of encoded audio data segments in a second encoding format, the second encoding format associated with payloads of a second size;
determining a least common multiple of the first size and the second size;
allocating a portion of a first data communications packet ("packet") to receive the first plurality of encoded audio data segments and the second plurality of encoded audio data segments based on the least common multiple;
inserting the first plurality of encoded audio data segments and the second plurality of encoded audio data segments into the portion of the first packet; and
transmitting the first packet.

9. The non-transitory computer-readable medium of claim 8, wherein the first size is larger than the second size.

10. The non-transitory computer-readable medium of claim 8, the method further comprising encoding a size of a non-data portion into the first byte of padding in the first packet.

11. The non-transitory computer-readable medium of claim 8, the method further comprising estimating an available bandwidth on the channel based on a latency associated with a second packet transmission, the second packet transmission preceding the first packet transmission, wherein transmitting the first packet comprises transmitting the first packet on the channel.

12. The non-transitory computer-readable medium of claim 11, wherein allocating the portion of the first packet comprises allocating an integer number of the least common multiple of bytes, the integer selected based upon the estimation of the available bandwidth.

13. The non-transitory computer-readable medium of claim 11, wherein estimating an available bandwidth comprises measuring a round-trip-time for the second packet.

14. The non-transitory computer-readable medium of claim 8, wherein the first packet comprises an FEC payload with BWE index, information bits, and RTT information.

15. A computer system comprising:
at least one processor;
at least one memory comprising instructions configured to cause the at least one processor to perform a method comprising:
receiving a first plurality of encoded audio data segments in a first encoding format, the first encoding format associated with payloads of a first size;
receiving a second plurality of encoded audio data segments in a second encoding format, the second encoding format associated with payloads of a second size;
determining a least common multiple of the first size and the second size;
allocating a portion of a first data communications packet ("packet") to receive the first plurality of encoded audio data segments and the second plurality of encoded audio data segments based on the least common multiple;
inserting the first plurality of encoded audio data segments and the second plurality of encoded audio data segments into the portion of the first packet; and
transmitting the first packet.

16. The computer system of claim 15, wherein the first size is larger than the second size.

17. The computer system of claim 15, the method further comprising encoding a size of a non-data portion into the first byte of padding in the first packet.

18. The computer system of claim 15, the method further comprising estimating an available bandwidth on the channel based on a latency associated with a second packet transmission, the second packet transmission preceding the first packet transmission, wherein transmitting the first packet comprises transmitting the first packet on the channel.

19. The computer system of claim 18, wherein allocating the portion of the first packet comprises allocating an integer number of the least common multiple of bytes, the integer selected based upon the estimation of the available bandwidth.

20. The computer system of claim 18, wherein estimating an available bandwidth comprises measuring a round-trip-time for the second packet.

\* \* \* \* \*